US007716229B1

(12) United States Patent
Srivastava et al.

(10) Patent No.: US 7,716,229 B1
(45) Date of Patent: May 11, 2010

(54) GENERATING MISSPELLS FROM QUERY LOG CONTEXT USAGE

(75) Inventors: Abhinai Srivastava, Redmond, WA (US); Lee Wang, Kirkland, WA (US); Ying Li, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 221 days.

(21) Appl. No.: 11/403,955

(22) Filed: Apr. 14, 2006

Related U.S. Application Data

(63) Continuation of application No. 11/394,101, filed on Mar. 31, 2006, now abandoned.

(51) Int. Cl.
*G06F 7/00* (2006.01)
*G06F 17/30* (2006.01)

(52) U.S. Cl. .................. 707/749; 707/737; 707/751; 707/759; 707/765; 707/777; 707/798; 707/999.003

(58) Field of Classification Search ............ 707/3
See application file for complete search history.

(56) References Cited

U.S. PATENT DOCUMENTS

| | | | | |
|---|---|---|---|---|
| 4,833,610 | A * | 5/1989 | Zamora et al. ............ | 707/5 |
| 5,404,507 | A | 4/1995 | Bohm | |
| 5,634,084 | A | 5/1997 | Malsheen | |
| 5,832,432 | A | 11/1998 | Trader et al. | |
| 6,212,517 | B1 | 4/2001 | Sato | |
| 6,385,629 | B1 | 5/2002 | Sundaresan | |
| 6,401,084 | B1 * | 6/2002 | Ortega et al. ............ | 1/1 |
| 6,446,068 | B1 * | 9/2002 | Kortge ................... | 707/6 |
| 6,463,428 | B1 | 10/2002 | Lee | |
| 6,701,309 | B1 * | 3/2004 | Beeferman et al. ........ | 707/3 |
| 6,738,780 | B2 | 5/2004 | Lawrence et al. | |
| 6,816,857 | B1 * | 11/2004 | Weissman et al. ......... | 707/5 |
| 7,092,936 | B1 | 8/2006 | Alonso | |
| 7,117,144 | B2 * | 10/2006 | Goodman et al. ......... | 704/9 |
| 7,225,184 | B2 * | 5/2007 | Carrasco et al. .......... | 707/3 |
| 7,236,923 | B1 | 6/2007 | Gupta | |
| 7,240,049 | B2 * | 7/2007 | Kapur .................... | 707/3 |

(Continued)

FOREIGN PATENT DOCUMENTS

WO    2005065401    7/2005

(Continued)

OTHER PUBLICATIONS

Leah S. Larkey et al., "Acrophile: An Automated Acronym Extractor and Server", Proceedings of the fifth ACM conference on Digital libraries, San Antonio, Texas, pp. 205-214, 2000.

(Continued)

*Primary Examiner*—Mohammad Ali
*Assistant Examiner*—Griselle Corbo
(74) *Attorney, Agent, or Firm*—Shook, Hardy & Bacon, LLP

(57) ABSTRACT

A method and system to generate variants, including misspells from query log context usage are provided. Usage context obtained from the query logs is utilized to facilitate similarity determination. A Similarity Graph generation process generates a Similarity Graph, which is transformed to provide variants having varying edit distances. The transformed Similarity Graph is loaded into a hash table and provides query corrections in a search engine or related terms when bidding on keyword in an advertising system.

14 Claims, 19 Drawing Sheets

U.S. PATENT DOCUMENTS

| | | | |
|---|---|---|---|
| 7,287,026 B2* | 10/2007 | Oommen | 1/1 |
| 7,293,018 B2* | 11/2007 | Hattori et al. | 707/3 |
| 7,321,892 B2* | 1/2008 | Vadon et al. | 1/1 |
| 7,385,591 B2* | 6/2008 | Goodman | 345/172 |
| 2002/0152064 A1 | 10/2002 | Dutta | |
| 2003/0055816 A1* | 3/2003 | Paine et al. | 707/3 |
| 2003/0088525 A1 | 5/2003 | Velez | |
| 2004/0024752 A1* | 2/2004 | Manber et al. | 707/3 |
| 2004/0088241 A1 | 5/2004 | Rebane | |
| 2004/0141354 A1* | 7/2004 | Carnahan | 365/145 |
| 2004/0181525 A1* | 9/2004 | Itzhak et al. | 707/5 |
| 2004/0220944 A1 | 11/2004 | Behrens | |
| 2004/0225647 A1 | 11/2004 | Connelly | |
| 2004/0236736 A1 | 11/2004 | Whitman | |
| 2004/0243568 A1 | 12/2004 | Wang | |
| 2005/0033771 A1* | 2/2005 | Schmitter et al. | 707/104.1 |
| 2005/0038894 A1 | 2/2005 | Hsu | |
| 2005/0060306 A1* | 3/2005 | Hattori et al. | 707/3 |
| 2005/0071325 A1* | 3/2005 | Bem | 707/3 |
| 2005/0080795 A1* | 4/2005 | Kapur et al. | 707/100 |
| 2005/0102259 A1* | 5/2005 | Kapur | 707/1 |
| 2005/0114319 A1 | 5/2005 | Brent | |
| 2005/0137939 A1* | 6/2005 | Calabria et al. | 705/26 |
| 2005/0144065 A1* | 6/2005 | Calabria et al. | 705/14 |
| 2005/0144068 A1* | 6/2005 | Calabria et al. | 705/14 |
| 2005/0165769 A1 | 7/2005 | Yoshida | |
| 2005/0228797 A1* | 10/2005 | Koningstein et al. | 707/100 |
| 2005/0267872 A1* | 12/2005 | Galai et al. | 707/3 |
| 2006/0004892 A1* | 1/2006 | Lunt et al. | 707/204 |
| 2006/0074870 A1* | 4/2006 | Brill et al. | 707/3 |
| 2006/0155751 A1* | 7/2006 | Geshwind et al. | 707/102 |
| 2006/0195442 A1* | 8/2006 | Cone et al. | 707/5 |
| 2006/0200340 A1* | 9/2006 | Fontenelle et al. | 704/5 |
| 2006/0224583 A1* | 10/2006 | Fikes et al. | 707/6 |
| 2006/0253423 A1 | 11/2006 | McLane | |
| 2006/0287988 A1* | 12/2006 | Mason | 707/3 |
| 2006/0288100 A1* | 12/2006 | Carson et al. | 709/224 |
| 2007/0038602 A1* | 2/2007 | Weyand et al. | 707/3 |
| 2007/0038621 A1* | 2/2007 | Weyand et al. | 707/5 |
| 2007/0067267 A1* | 3/2007 | Ives | 707/3 |
| 2007/0100993 A1* | 5/2007 | Malhotra et al. | 709/224 |
| 2007/0118394 A1* | 5/2007 | Cahoon | 705/1 |
| 2007/0162379 A1* | 7/2007 | Skinner | 705/37 |
| 2007/0192318 A1* | 8/2007 | Ramer et al. | 707/7 |
| 2007/0198506 A1* | 8/2007 | Attaran Rezaei et al. | 707/5 |
| 2007/0214128 A1* | 9/2007 | Smith et al. | 707/4 |
| 2007/0226198 A1* | 9/2007 | Kapur | 707/3 |
| 2007/0233723 A1* | 10/2007 | Mazzagatti | 707/102 |
| 2008/0040329 A1 | 2/2008 | Cussen | |
| 2008/0104062 A1* | 5/2008 | Oliver et al. | 707/5 |

FOREIGN PATENT DOCUMENTS

| | | |
|---|---|---|
| WO | 2005065401 A2 | 7/2005 |

OTHER PUBLICATIONS

Chih Lee et al., "Identifying Relevant Full-Text Articles for GO Annotation without McSH Terms", Proceedings of the 13th Text Retrieval Conference, NIST Special Publication, 500-261, Nov. 16-19, 2004.

International Search Report dated Aug. 17, 2007.

Non-Final Office Action for U.S. Appl. No. 11/378,280. Mail Date May 12, 2008.

Final Office Action for U.S. Appl. No. 11/378,280. Mail Date Jan. 30, 2009.

SVD Subspace Projections for Term Suggestion Ranking and Clustering; Introduction http://research.yahoo.com/publication/YRL-2004-023.pdf.

Google Adwords, https://adwords.google.com/support/bin/answer.py?answer=6100&hl=en_US.

Global Promoter; Finding Keywords with Global Promoter's Free Keyword Generator, Tool Keyword Suggestion Tool: Finding Keywords the Easy Way, http://www.globalpromoter.com/seo-tools/keyword-suggestion-tool.cfm.

Wordtracker Keywords; Effective Search Engine Optimization Depends on Choosing the Best Keywords, http://www.wordtracker.com/tell-me-more.html.

Derwent 2007-445730.

Notice of Allowance issued Sep. 18, 2009 in U.S. Appl. No. 11/300,919.

Non-Final Office Action for U.S. Appl. No. 11/378,280, mailed May 12, 2008.

Final Office Action for U.S. Appl. No. 11/378,280, mailed Jan. 30, 2009.

Advisory Action for U.S. Appl. No. 11/378,280, mailed Jul. 13, 2009.

Non-Final Office Action for U.S. Appl. No. 11/378,280, mailed Oct. 13, 2009.

Notice of Allowance for U.S. Appl. No. 11/300,919, mailed Apr. 8, 2009.

Notice of Allowance for U.S. Appl. No. 11/300,919, mailed Aug. 7, 2009.

\* cited by examiner

| CHARACTERS | THRESHOLD 1 | THRESHOLD 2 | ... N |
|---|---|---|---|
| 5 | 1 | 1 | |
| 6 | 3 | 3 | |
| 10 | 4 | 4 | |
| 20 | 5 | 5 | |

GENERATING MISSPELLS FROM QUERY LOG CONTEXT USAGE

CROSS-REFERENCE TO RELATED APPLICATION

This application is a continuation of application Ser. No. 11/394,101, filed Mar. 31, 2006 from which application priority is thereby claimed.

STATEMENT REGARDING FEDERALLY SPONSORED RESEARCH OR DEVELOPMENT

Not applicable.

BACKGROUND

The Internet provides users with a mechanism for obtaining information regarding any suitable subject matter. For example, various web sites are dedicated to posting text, images, and video relating to world, national, and local news. A user with knowledge of a uniform resource locator (URL) associated with one of such web sites can simply enter the URL into a web browser to be provided with the web site and access content. Another conventional manner of locating desired information from the Internet is through utilization of a search engine. For instance, a user can enter a word or series of words into a search field and initiate a search (e.g., through depression of a button, one or more keystrokes, voice commands, etc.). The search engine then utilizes search algorithms to locate web sites related to the word or series of words entered by the user into the search field, and the user can then select one of the web sites returned by the search engine to review related content.

Oftentimes, users who are searching for information will see related advertisements and click on such advertisements to purchase products, thereby creating business for that particular retailer. Furthermore, the search engine is provided with additional revenue by selling advertisement space for a period of time to a retailer when a relevant term, such as, for example, the term "doggie," is utilized as a search term. Thus, an individual who enters the term "doggie" into a search engine may be interested in purchasing items related to dogs—thus, it is beneficial for a company that sells pet items to advertise to that user at the point in time that the user is searching for a relevant term.

Because of the potential of a significant boost in revenue from advertising with search terms, it is very likely that a business will associate as many search terms and variations as possible to their advertisements. For example, an advertiser of pet items might submit a list of terms and variations for "doggie," such as "dog," "dogs," and "doggy." The intent of the advertiser is to select all terms and variations that would likely be used by users during a search. However, these lists of terms are often manually composed and frequently omit terms/variations that might increase sales for the advertiser. As an example, sometimes different spellings of words become popular that would not normally be included in the lists such as "dogz" or "doggee." Automatically finding these terms and including them in associated advertising terms could substantially improve sales for the advertiser and revenue for a search engine provider.

SUMMARY

Embodiments of the invention provide a system and method for generating variants based on context usage in query logs. The query logs are processed to generate a Similarity Graph indicating similarities between keywords. The Similarity Graph is transformed to a misspell graph after pruning the Similarity graph based on edit distances. Based on context usage information included in the query logs, the misspell graph provides a collection of keywords and misspells associated with the keywords.

In an embodiment, the misspell graph may be stored in a data structure and loaded into a search engine or advertisement system. The search engine may utilize the misspell graph to automatically correct queries, and the advertisement system may utilize the misspell graph to provide a list of related terms that correspond to the keywords, and the related terms may be associated with the advertisement.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
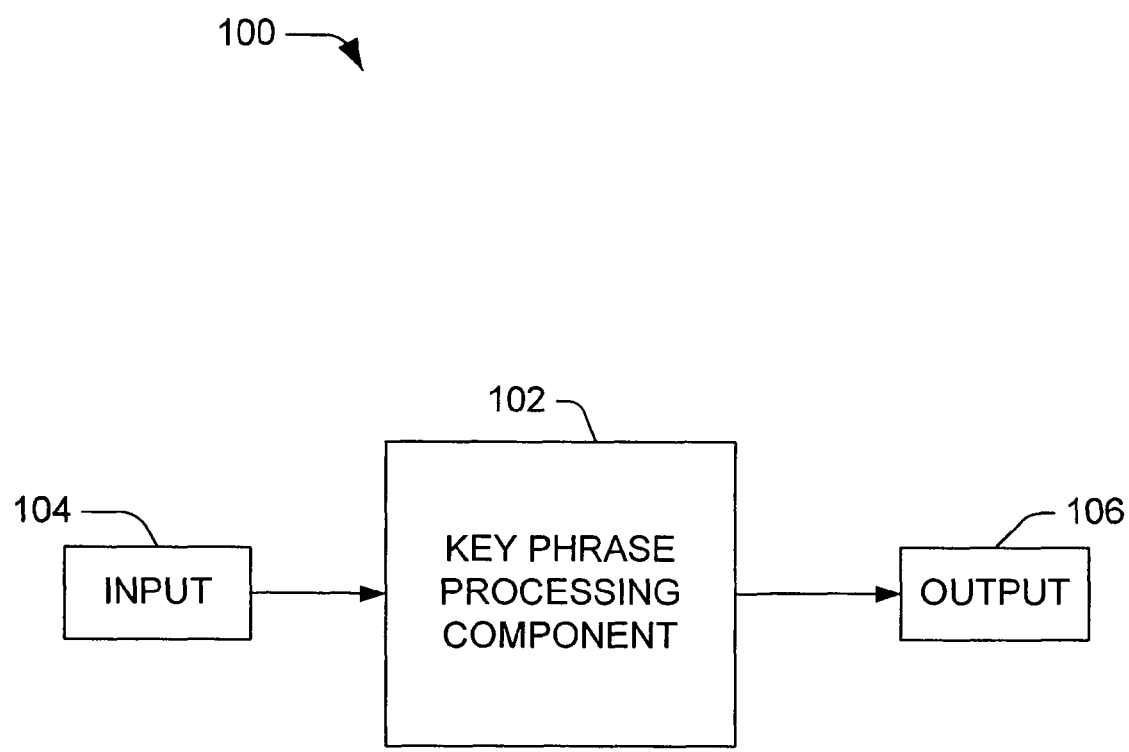
FIG. 1 is a block diagram of a key phrase processing system in accordance with an embodiment of the invention.

A Similarity Graph is a collection of edges and nodes, where the nodes represent query terms and the edges represent the correlations between one or more nodes. Embodiments of the provide variants related to one or more keywords. The variants are selected based on context usage for terms in a Similarity Graph. The Similarity Graph is processed to generate a misspell graph that provides information about misspells associated with a keyword.

A system that provides the misspell graph may include a search engine and an advertisement component. The search engine and advertisement component may store the misspell graph is a compact data structure. In an embodiment, the search engine may utilize the misspell graph to automatically correct queries. Similarly, the advertiser component may utilize the misspell graph to provide a collection of related terms, that include frequent misspells associated with a term.

The subject matter is now described with reference to the drawings, wherein like reference numerals are used to refer to like elements throughout. In the following description, for purposes of explanation, numerous specific details are set forth in order to provide a thorough understanding of the subject matter. It may be evident, however, that subject matter embodiments may be practiced without these specific details. In other instances, well-known structures and devices are shown in block diagram form in order to facilitate describing the embodiments.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers.

Furthermore, a computer-implemented method is a method implemented at least in part by a machine or a method implemented at least in part by a computing device. The machine or computing device includes, but are not limited to, a laptop, desktop, personal digital assistant, or multi-processing systems, or any device capable of storing or executing instructions associated with the methods described in the following description.

During the process of bidding for a keyword in online keyword auction systems for search engines, advertisers have to supply a long list of mutations for the same keyword to maximize their reach while retaining relevance. Absence of a system that automatically makes such recommendations forces the advertisers to supply such a list manually. This is both cumbersome and inefficient. Since the advertiser has no direct way of knowing the relative frequency of various possible keyword mutations, it is highly likely that they miss out on some of the important mutations. Instances of the systems and methods herein discover key phrases and/or measure their similarity by utilizing the usage context information from search engine query logs. The information of similarity levels between two key phrases can then be used to narrow down the search space of several tasks in online keyword auctions, such as finding all the frequent misspellings of a given keyword, finding the keyword/acronym pairs, finding key phrases with similar intention, and/or finding keywords which are semantically related.

In FIG. 1, a block diagram of a key phrase processing system 100 in accordance with an an embodiment of the invention. The key phrase processing system 100 is comprised of a key phrase processing component 102 that receives an input 104 and provides an output 106. The input 104 is generally comprised of search query log information. This type of data is typically compiled when users search for things of interest on a network such as the Internet and/or an intranet. The logs can contain search terms and/or other information associated with a search such as, for example, time when the search was executed, number of hits, and/or user identification and the like. The key phrase processing component 102 utilizes textual strings of queries in the logs to provide the output 106. A number of "hits" or times the search query was entered can also be utilized by the key phrase processing component 102. The output 106 can be comprised of, for example, atoms, a key phrase list, query breakup data and/or a Similarity Graph (described infra) and the like. The atoms may be part of the Similarity Graph. In an embodiment of the invention, an atom is an indivisible unit that represents a phrase or word. Thus, the key phrase processing component 102 can be employed to facilitate in extracting key phrases or atoms and/or determine similarities between the key phrases based on the input 104. Similarities between key phrases can be utilized in applications such as, for example, advertising systems where an association of one search key term to another can be invaluable.

Figure 2:
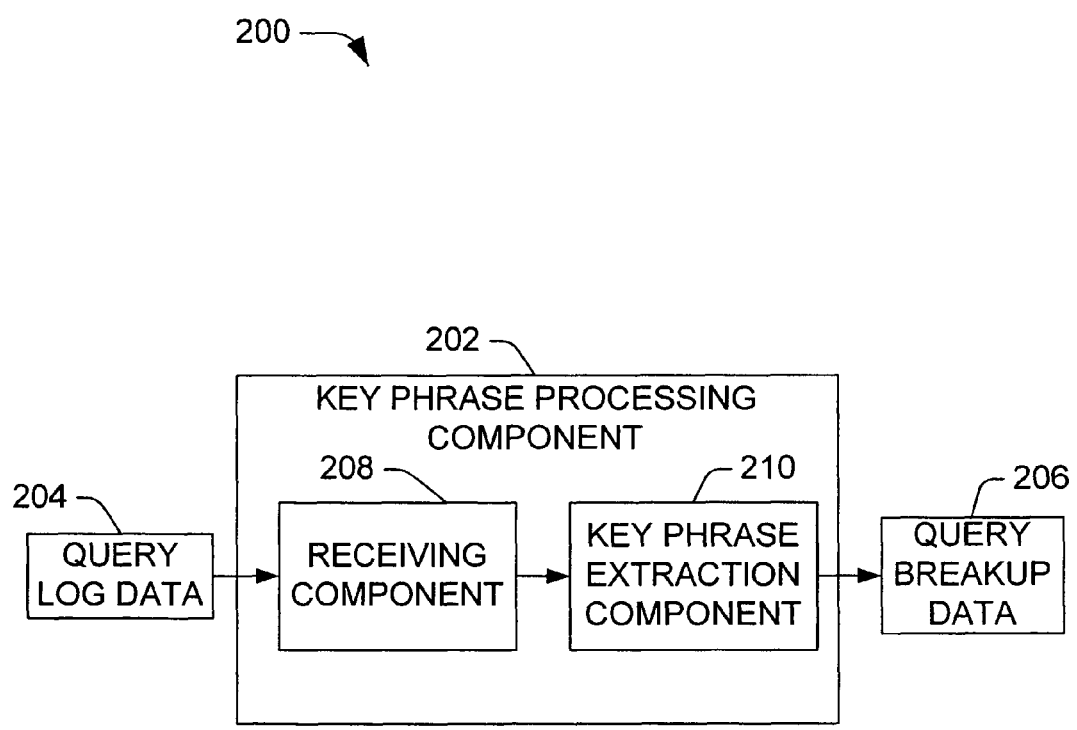
FIG. 2 is another block diagram of a key phrase processing system in accordance with an embodiment of the invention.

Looking at FIG. 2, another block diagram of a key phrase processing system 200 in accordance with an aspect of an embodiment is depicted. The key phrase processing system 200 is comprised of a key phrase processing component 202 that receives query log data 204 and provides query breakup data 206. In other instances a key phrase list can also be provided (not illustrated). The key phrase processing component 202 is comprised of a receiving component 208 and a key phrase extraction component 210. The receiving component 208 obtains query log data 204 from a network associated data source such as, for example, a local network (e.g., intranet) data source and/or a global network (e.g., the Internet) data source and the like. The receiving component 208 can also provide basic pre-filtering of the raw data from the query log data 204 if required by the key phrase extraction component 210. For example, the receiving component 208 can re-format data and/or filter data based on a particular time period, a particular network source, a particular location, and/or a particular amount of users and the like. The receiving component 208 can also be co-located with a data source. The key phrase extraction component 210 receives the query log data 204 from the receiving component 208 and extracts key phrases. The extraction process is described in detail infra. The key phrase extraction component 210 can also directly receive the query log data 204 for processing. The extracted key phrases are then utilized to provide the query breakup data 206. The query breakup data 206 is typically a data file that is employed to determine Similarity Graphs (see infra) for the extracted key phrases.

Figure 3:
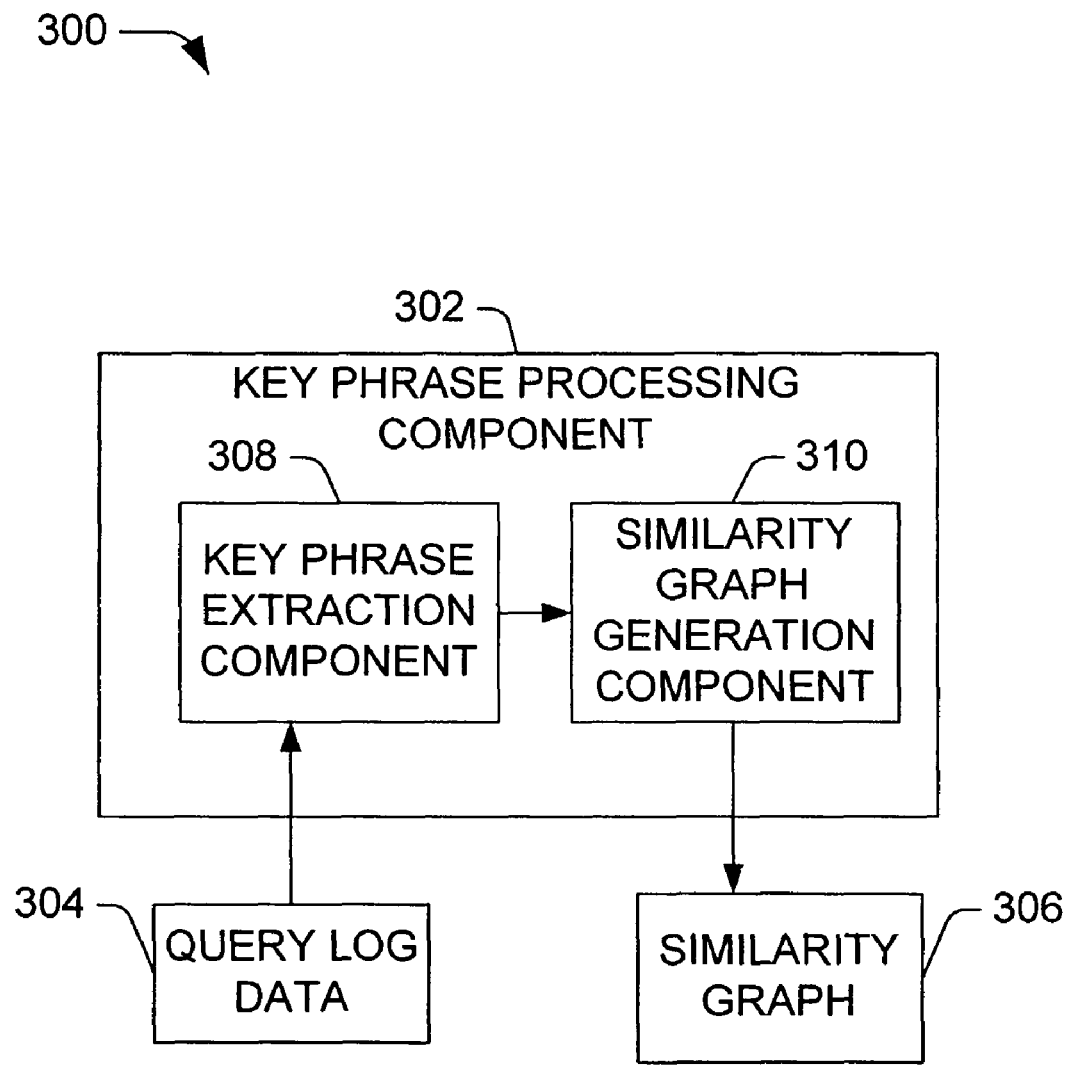
FIG. 3 is yet another block diagram of a key phrase processing system in accordance with an embodiment of the invention.

Turning to FIG. 3, yet another block diagram of a key phrase processing system 300 in accordance with an aspect of an embodiment is illustrated. The key phrase processing system 300 is comprised of a key phrase processing component 302 that receives query log data 304 and provides Similarity Graph 306. The key phrase processing component 302 is comprised of a key phrase extraction component 308 and a Similarity Graph generation component 310. The key phrase extraction component 308 obtains query log data 304 from a network associated data source such as, for example, a local network data source and/or a global network data source and the like. The key phrase extraction component 308 extracts key phrases from the query log data 304. The extracted key phrases are then utilized to provide query breakup data to the Similarity Graph generation component 310. The Similarity Graph generation component 310 processes the query breakup data to generate the Similarity Graph 306. Similarity Graph generation is described in detail infra.

Figure 4:
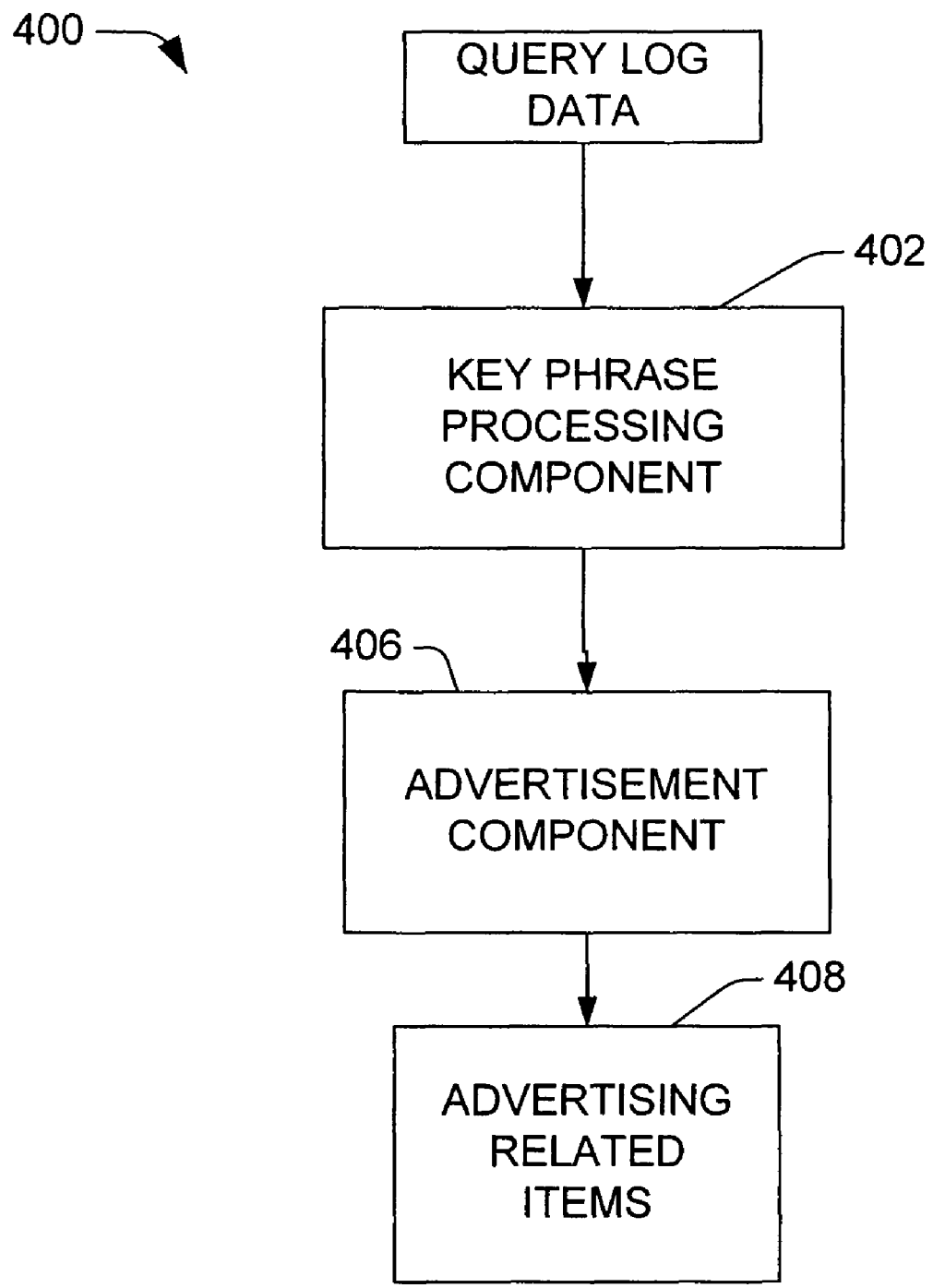
FIG. 4 is a block diagram of a key phrase processing system utilized with an advertisement component in accordance with an embodiment of the invention.

Moving on to FIG. 4, a block diagram of a key phrase processing system 400 utilized with an advertising component 406 in accordance with an aspect of an embodiment is shown. The key phrase processing system 400 is comprised of a key phrase processing component 402 that receives query log data 404 and interacts with advertisement component 406 which provides advertising related items 408 for advertisers. In this instance, the key phrase processing component 402 generates a Similarity Graph from the query log data 404 and provides this to the advertisement component 406. This allows the advertisement component 406 to generate advertising related items 408. The advertising related items 408 can include, for example, frequent misspellings of a given keyword, keyword/acronym pairs, key phrases with similar intention, and/or keywords which are semantically related and the like. This substantially increases the performance of the advertisement component 406 and facilitates in automatically generating terms for advertisers, eliminating the need to manually track related advertising search terms.

This is contrary to the current process of bidding for a keyword in the online keyword auction systems for search engines in which advertisers have to supply a long list of mutations for the same keyword to maximize their reach while retaining relevance. Various kinds of mutations are: (1) Misspells/Multiple spellings—for example, an advertiser targeting users who searched for "britney spears" must bid for the most common spellings of the name such as, for example, "britney spears", "brittany spears", etc.; (2) Acronyms—for example, advertisers targeting keyword "hewlett packard" must also bid on "hp."; (3) Similar intention—for example, advertisers selling cheap air tickets must bid on "cheap air tickets," "cheap air fares," "cheap airlines," "discount fares" and so on; and (4) Related keywords—for example, advertisers selling pet supplies must bid for "cats," "dogs," "rottweiler" and so on.

Presently, absence of a process that automatically makes such recommendations forces the advertisers to supply such a list manually. This is both cumbersome and inefficient. Since the advertiser has no direct way of knowing the relative frequency of various possible keyword mutations, it is highly likely that they miss out on some of the important mutations. This manual and often incomplete provision of such keyword lists results in loss of customers for the advertiser and loss of revenues for search engines.

Embodiments of the invention generate a context-sensitive Similarity Graph that may provide an efficent mechanism to retrive related terms or misspells. First, a process is utilized to discover atoms or key phrases that are statistically sound from raw query logs. This facilitates in: (1) breaking down individual queries into a vector of key phrases; (2) removing the associated noise while capturing the usage context of a key phrase in a given query; and (3) capturing the statistically most significant key phrases that are used by users by the common patterns in which they framed search queries. Secondly, a process is utilized to take a list of key phrase segmented queries as input and return a Similarity Graph as output. The Similarity Graph is a graph with the key phrases as its nodes. Two nodes are joined with an edge if similarity between them is greater than a given threshold. The edge weight is represented by the similarity value between two key phrases. This value ranges between "0" and "1." A value of "0" represents completely dissimilar while a value of "1" represents completely similar.

Figure 5:
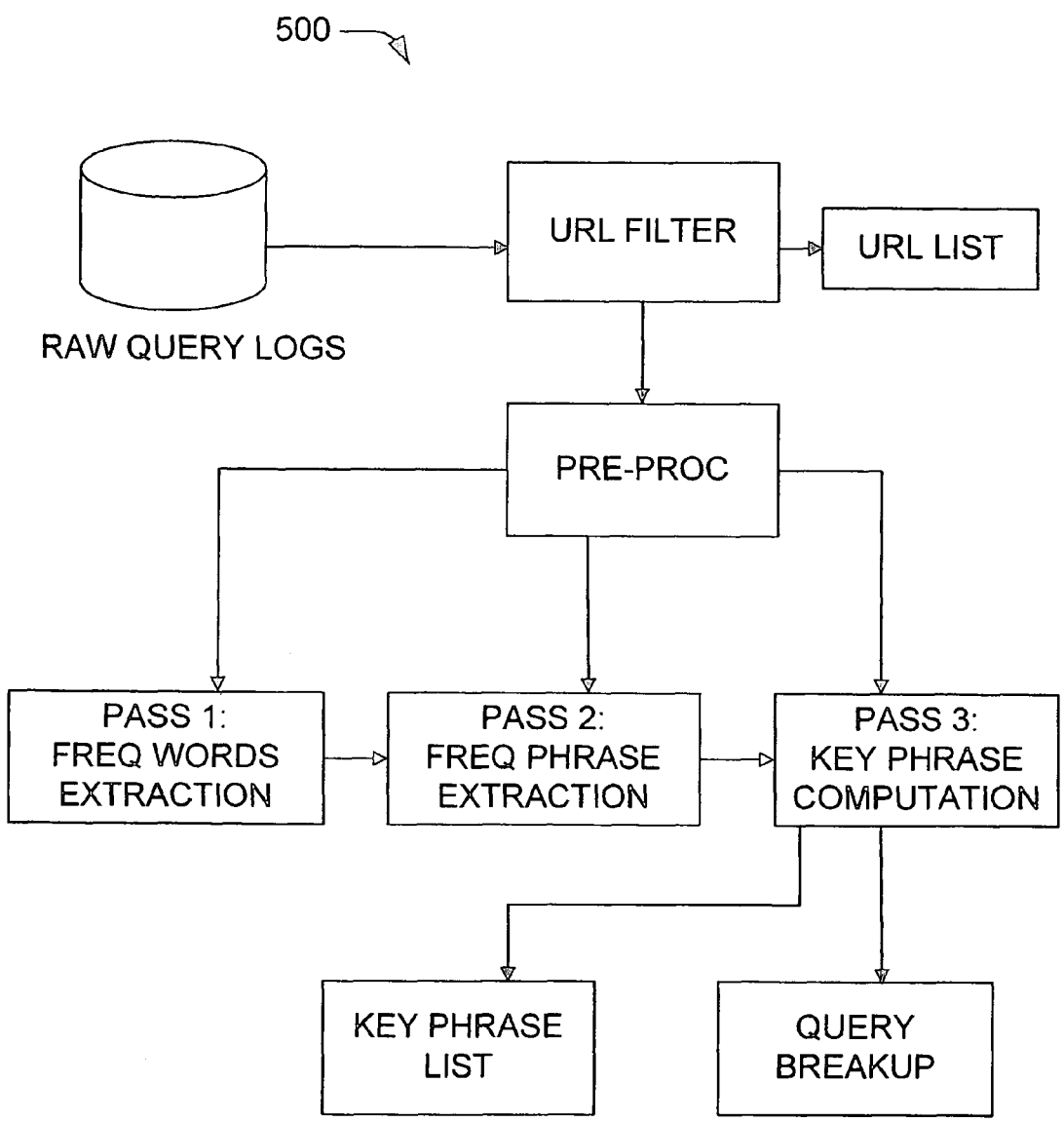
FIG. 5 is an overview example of a key phrase extraction process in accordance with an embodiment of the invention.

Turning to FIG. 5, an overview example of a atom or key phrase extraction process 500 in accordance with an aspect of an embodiment is shown. In the embodiment shown in FIG. 5, the atom or key phrase extraction process 500 is generally comprised of the following passes on search query logs:

Noise Filtering: This pass includes, but is not limited to, the following: First, the query logs are passed through a URL filter which filters out queries which happen to be a URL. This step is important for noise reduction because roughly 15% of search engine logs are URLs. Second, non-alphanumeric characters, except punctuation marks, are omitted from the queries. Third, queries containing valid patterns of punctuation marks like ".", ",", "?" and quotes and the like are broken down into multiple parts at the boundary of punctuation.

Low-frequency word filtering: In this pass, frequencies of individual words that occur in the entire query logs are determined. At the end of this pass, words which have a frequency lower than a pre-set threshold limit are discarded. This pass eliminates the generation of phrases containing infrequent words in the next step. Typically, if a word is infrequent then a phrase which contains this word is likely infrequent as well.

Key-phrase candidate generation: In this pass, possible phrases up-to a pre-set length of N words for each query is generated, where N is an integer from one to infinity. Typically, a phrase which contains an infrequent word, a stop-word at the beginning, a stop-word at the end, and/ or a phrase that appears in a pre-compiled list of non-standalone key phrases are not generated. At the end of the pass, frequencies of phrases are counted and infrequent phrases are discarded. The remaining list of frequent phrases is called a "key phrase candidate list."

Key-phrase determination: For each query, the best break is estimated by a scoring function which assigns a score of a break as sum of (n−1)×frequency+1 of each constituent key phrase. Here, n is a number of words in the given key phrase and can be an integer from one to infinity. Once the best break is determined, a real count of each constituent key phrase of the best query break is incremented by 1. This pass outputs a query breakup in a file for later use to generate a Co-occurrence Graph.

One can make an additional pass through the list of key phrases generated in the above step and discard the key phrases with a real frequency below a certain threshold when the count of obtained key phrases exceeds the maximum that is needed.

Figure 6:
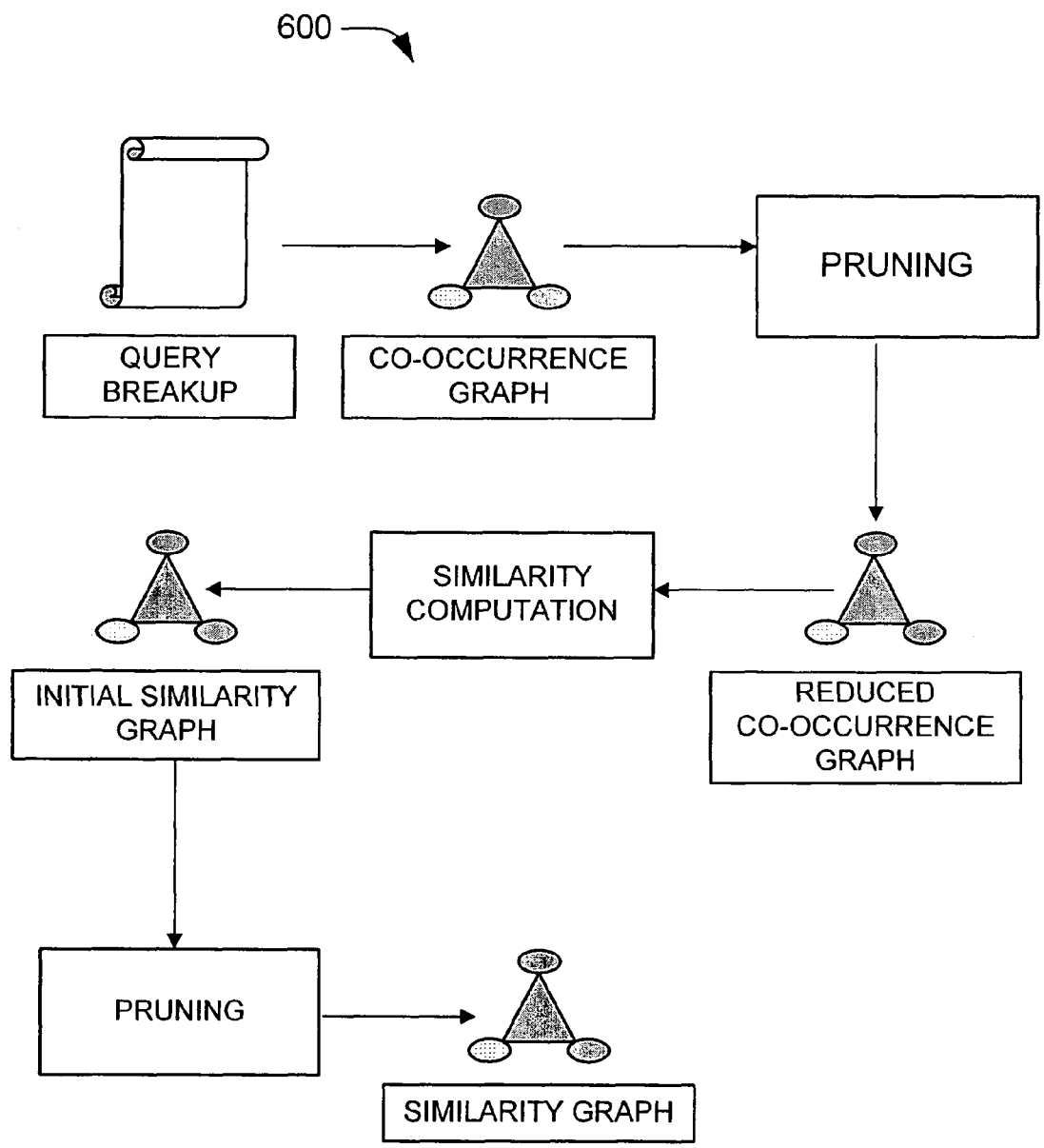
FIG. 6 is an overview example of a Similarity Graph generation process in accordance with an embodiment of the invention.

Looking at FIG. 6, an overview example of a Similarity Graph generation process 600 in accordance with an aspect of an embodiment is depicted. The Similarity Graph generation process 600 is typically comprised of the following:

Co-occurrence Graph generation: Using the query breakup file generated in a key phrase extraction process, a key phrase Co-occurrence Graph is generated. A Co-occurrence Graph is a graph with key phrases as nodes and edge weights representing the number of times two key phrases are part of the same query. For example, if a breakup of a query had three key phrases, namely, a, b, and c then the weights of the following edges are incremented by 1: {a,b}, {a,c} and {b,c}.

Co-occurrence Graph pruning: Once the Co-occurrence Graph has been generated, noise is removed by pruning edges with a weight less than a certain threshold. Next, nodes which have less than a certain threshold number of edges are pruned. Edges associated with these nodes are also removed. Further, the top K edges for each node are determined, where K is an integer from one to infinity. Edges, except those falling into the top K of at least 1 node, are then removed from the graph.

Similarity Graph creation: A new graph called the Similarity Graph is then created. The set of nodes of this graph is the key phrases which remain as nodes in the Co-occurrence Graph after Co-occurrence Graph pruning.

Similarity Graph edge computation: For each pair $\{n_1, n_2\}$ of nodes in the Similarity Graph, an edge $\{n_1, n_2\}$ is created if and only if the similarity value $S(n_1,n_2)$ for the two nodes in the Co-occurrence Graph is greater than a threshold T. The weight of the edge $\{n_1,n_2\}$ is $S(n_1,n_2)$. The similarity value $S(n_1,n_2)$ is defined as the cosine distance between the vectors $\{e_1 n_1, e_2 n_1 \ldots\}$ and $\{e_1 n_2, e_2 n_2 \ldots\}$, where $e_1 n_1, e_2 n_1 \ldots$ are the edges connecting node $n_1$ in the Co-occurrence Graph and $e_1 n_2, e_2 n_2 \ldots$ are the edges connecting node $n_2$ in the Co-occurrence Graph. Cosine distance between two vectors $V_1$ and $V_2$ is computed as follows: $(V_1 \cdot V_2)/|V_1| X |V_2|$. A total of $\sim nC_2$ distance computations are required at this stage.

Similarity Graph edge pruning: The top E edges by edge weight for each node in the Similarity Graph are then determined, where E is an integer from one to infinity. The edges, except those falling in the top E edges of at least one node, are removed. Typically, the value of E is approximately 100.

Output: Output the generated Similarity Graph generated above.

The Similarity Graph can be stored in a hash table data structure for very quick lookups of key phrases that have a similar usage context as the given key phrase. The keys of such a hash table are the atoms or key phrases and the values are a list of key phrases which are neighbors of the hash key in the Similarity Graph. The main parameter to control the size of this graph is the minimum threshold value for frequent key phrases in the key phrase extraction process. The size of the Similarity Graph is roughly directly proportional to the coverage of key phrases. Hence, this parameter can be adjusted to suit a given application and/or circumstances.

Figure 7:
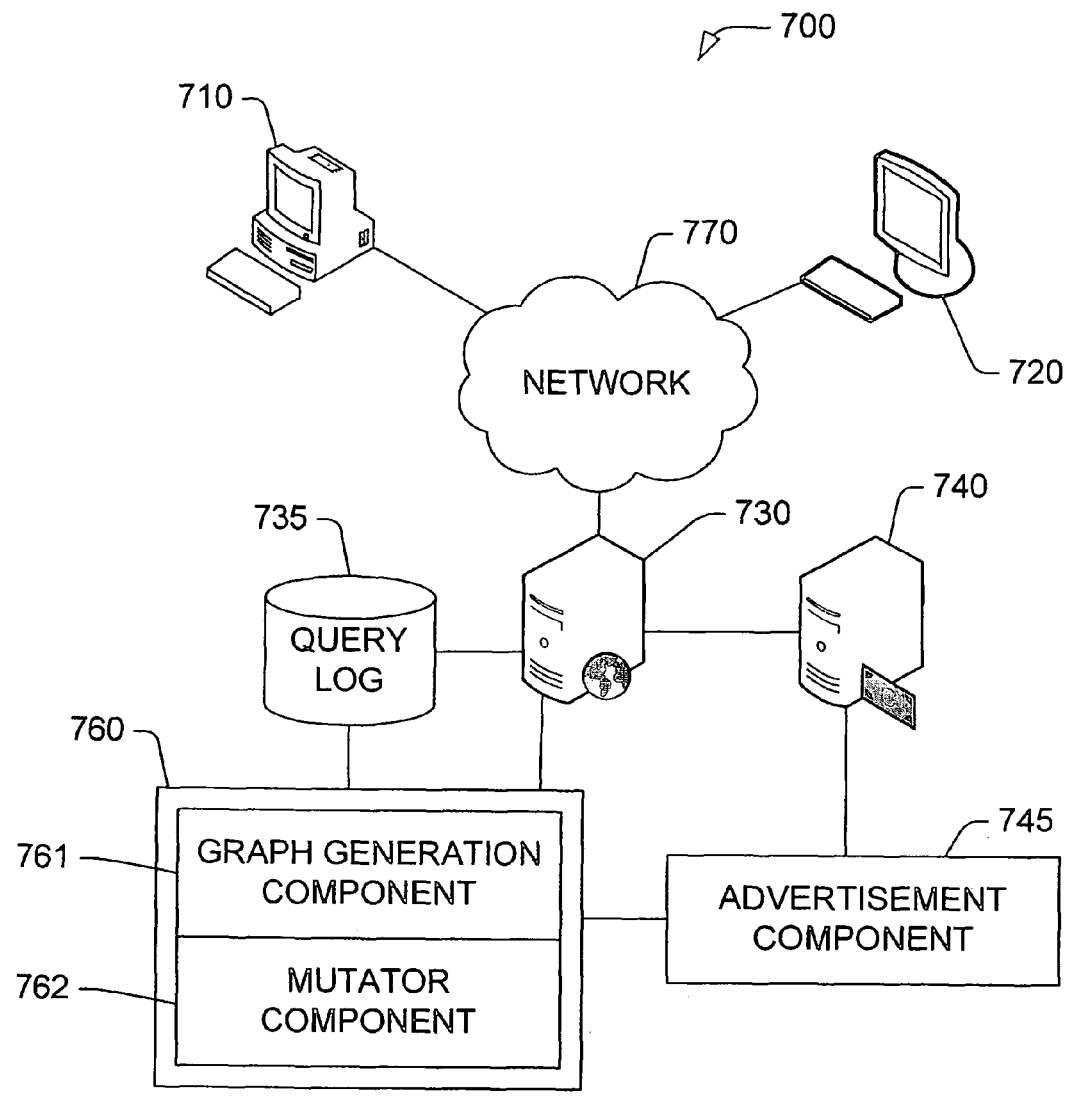
FIG. 7 is network schematic of a computing environment in accordance with an embodiment of the invention.

FIG. 7 is network schematic of a computing environment 700 in accordance with an embodiment of the invention. The computing environment 700 is not intended to suggest any limitation as to scope or functionality. Embodiments of the invention are operable with numerous other special purpose computing environments or configurations. With reference to FIG. 7, the computing environment 700 includes client computer 710, advertiser computer 720, search engine 730, advertisement server 740, variant-graph-generation component 760 and a network 770.

The client computer 710 allows a user to issue queries to the search engine 730, which generates results in response to the queries. The client computer 710 receive the results, which may include advertisements. In an embodiment of the invention, in response to a query the client computer 710 receives a collection of contextually similar terms. The client computer 710 may initiate subsequent queries using the contextual similar terms. In an alternate embodiment of the invention, when the query includes a misspell, the search engine 730 may automatically correct the errors and issue the corrected query to retrieve results. In certain embodiments, the client computer 710 may be notified of the potential misspell and corrections or suggestions are provided to the client computer 710, while results for the incorrect query are retrieved. In another embodiment, the search associated with the query may not be initiated until the client computer 710 selects a related term, correction or suggestion.

Similar to the client computer 710, the advertiser computer 720 may access the search engine 730 to retrieve content, including web content and advertisements. Additionally, the advertiser computer 720 allows advertisers to place bids on keywords associated with products that advertiser would like to promote. In an embodiment of the invention, the advertiser computer 720 provides information on the most common spelling mistakes for keywords that an advertiser is bidding on. The advertiser computer 720 allows the advertiser to efficiently determine the best keywords and associated misspells. The search engine 730 may be communicatively connected to an advertisement server 740 that processes the bid requests. The advertisement server 740 includes an advertisement component 745 that provides related terms, misspells or variants for keywords the advertiser is bidding on. The advertisement server 740 may generate an offer to allow an advertisement to be associated with a collection of query terms for a time period. The offer may include, but is not limited, a list of query terms, the time period, and the price. Once payment is received, the advertisements are associated with the collection of query terms. Thus, subsequent queries having the terms include in the collection of query terms retrieve results having the advertiser's advertisements.

The search engine 730 generates responses to requests received from the client computer 710 and advertiser computer 720. The responses may include search results and advertisements related to query terms included in the request. Additionally, the search engine 730 stores the received requests in a query log 735. The query log 735 includes, but is not limited to, the query terms, time of issuance, etc. In an embodiment of the invention, the search engine 730 communicates with the advertisement server 740 to retrieve advertisements associated with the query terms in the request.

When generating contextually related words or misspells, the variant-graph-generation component 760 processes the query log to generate a related or misspell graph. The variant-graph-generation component 760 includes a graph generation component 761, and a mutator component 762. In an embodiment, the graph generation component 761 processes the query log to generate a Similarity Graph having nodes and edges, wherein the nodes represent atoms or query terms and the edges connect the nodes. The mutator component 762 utilizes the Similarity Graph to generate a misspell graph having nodes that represent correct spellings connected to nodes that represent misspells. Additionally, in certain embodiments of the invention, the misspell graph is utilized to determine related terms based on frequency of usage within the query logs 735. In an embodiment of the invention, the misspell graph is generated off-line at a specified interval to reduce computational latencies. The interval may be weekly, monthly or quarterly, semi-annually, or annually. Furthermore, the misspell graph may be stored in the advertisement component or the search engine to facilitate automated term correction or related term suggestion. Thus, the misspell graph may be hashed and stored in a data structure, such as a linked list or look-up table to provide efficient access to the misspells and related terms.

Additionally, the variant-graph-generation component 760 and advertisement component 745 may utilize computer-readable media to access instructions associated with generating related terms. The computer-readable media may include computer storage and communication media that are removable or non-removable and volatile or non-volatile. By way of example, and not limitation, computer storage media includes electronic storage devices, optical storages devices, magnetic storage devices, or any medium used to store information that can be accessed by the variant-graph generation component 760 and advertisement component 745, and communication media may include wired and wireless media. The input devices (not shown) may include, mice, keyboards, joysticks, controllers, microphones, cameras, camcorders, or any suitable device for providing user input.

The network 770 may be a communication network such as, but not limited to, Local Area Network, Internet, Wide Area Network or Wireless Network. The communications between the client computer 710, advertiser computers 720 and search engine 730 and advertisement server 740 may be facilitated through network 700.

In an embodiment, the Similarity Graph is computed from usage context information in the query logs. The Similarity Graph is further processed to statistically determine correct spellings for atoms or keywords. A collection of transformations performed on the Similarity Graph generates groups of mutually-connected nodes, where each group includes a root node.

Figures 8, 9:
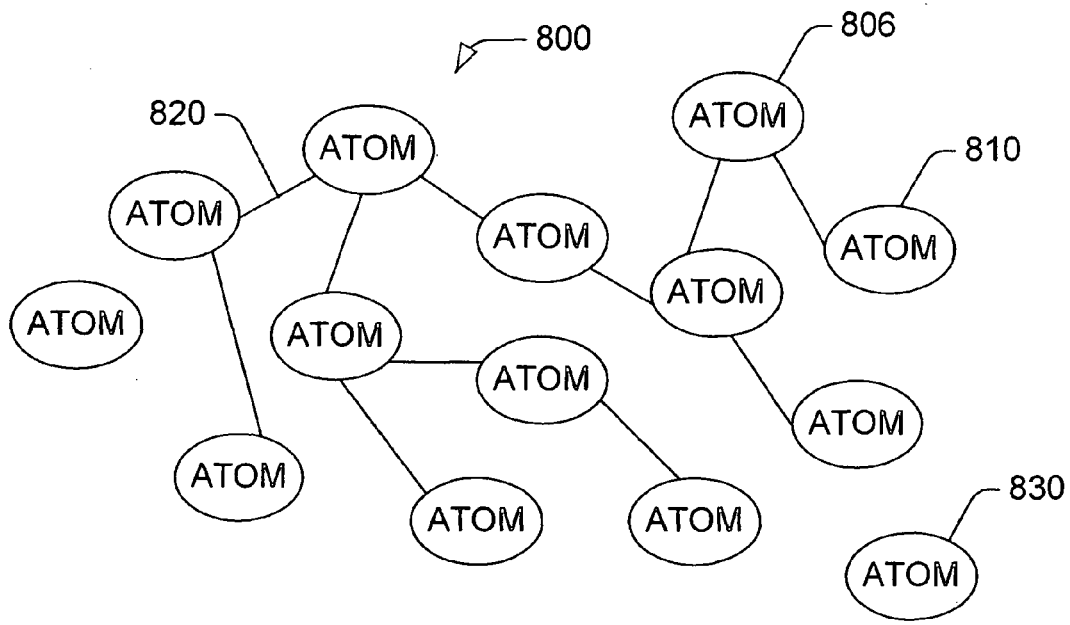
FIG. 8 is graph diagram that illustrates the Similarity Graph in accordance with an embodiment of the invention.
FIG. 9 is a table that represent threshold values utilized when processing the Similarity Graph in accordance with an embodiment of the invention.

FIG. 8 is graph diagram that illustrates the Similarity Graph 800 in accordance with an embodiment of the invention. The Similarity Graph 800 includes a collection of atoms 810 connected by one or more edges 820. The atoms 810 represent terms, or key phrases extracted from the query logs. The edges 820 may represent similarity between the atoms 810. In an embodiment, if an atom 830 is not connected to other atoms, this indicates that the term is an outlier and should be discarded.

The transformations performed on the Similarity Graph utilize threshold information to determine whether to drop edges. The threshold information measures the relatedness between two nodes based on edit distances between the nodes. In an embodiment, the number of characters and threshold may be pre-specified. In other embodiments, the user is allowed to incrementally alter the characters or threshold to achieve better results.

FIG. 9 is a table 900 that represent threshold values utilized when processing the Similarity Graph in accordance with an embodiment of the invention. The table 900 includes a characters field 910 that specifies an estimated length of the query term. In certain embodiment, the characters field 910 may specify the length of the query or related terms. Additionally, the table 900 includes "threshold 1" 920 and "threshold 2" 930. The values for "threshold 1" 920 and "threshold 2" 930 are normally fixed for a specified character length. Thus, for each character length, "threshold 1" 920 and "threshold 2" 930 are the same. In some embodiments, the user may alter the thresholds to different values. Accordingly, the thresholds may be utilized to represent maximum edit distances for a specified character length. In certain embodiment of the invention, the number thresholds may vary from two to N, where N is a positive number between two and infinity.

The edit-distance algorithm is applied to the Similarity to Graph to determine the number of letters or alphabets that must be changed to create the linked node. The edit distance is calculated between neighboring nodes, and the value of the calculated edit distance is assigned as the weight for the edge connecting the neighboring nodes. Alternatively, in certain embodiments, the edit distance may be represented by the minimum number of operations needed to transform one string into the other, where an operation is an insertion, deletion, or substitution of a single character.

Figure 10:
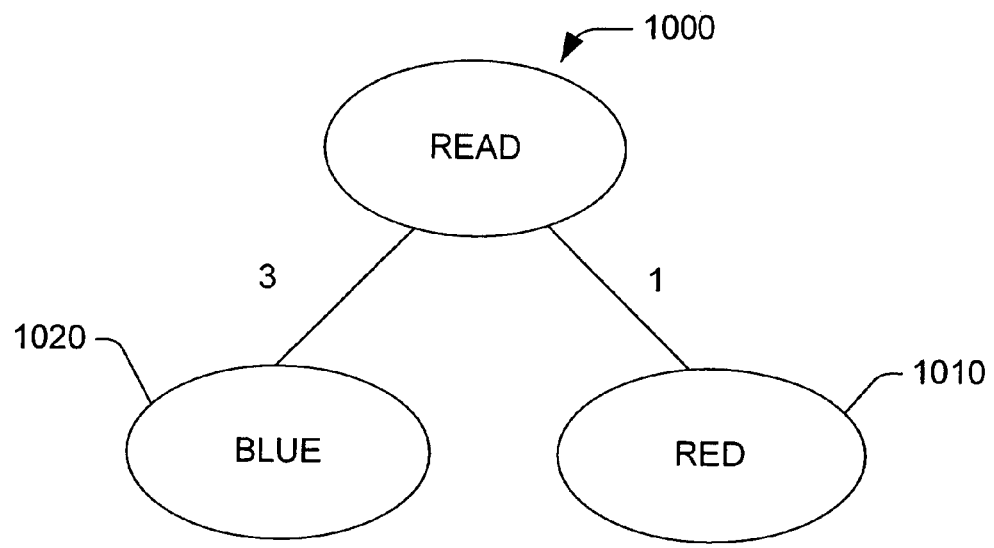
FIG. 10 illustrates example results associated with applying an edit-distance algorithm to the a portion of the Similarity Graph, which creates an Edit-Distance Graph in accordance with an embodiment of the invention.

FIG. 10 illustrates example results associated with applying an edit-distance algorithm to the a portion of the Similarity Graph, which creates an Edit-Distance Graph in accordance with an embodiment of the invention. Here the portion of the similarity graph includes three nodes, node 1000 representing the atom "read," node 1010 representing the atom "red" and node 1020 representing the atom "blue." When edit distance is classified as the number of character changes necessary to arrive from a first node to the neighboring node, the edge (1000,1020) is assigned a weight of three and edge (1000, 1010) is assigned a weight of 1. The edge (1000,1020) is assigned a three because "B", "L," and "U" are changed with "R", "A," "D." This represents three character changes. Similarly, (1000,1010) is assigned a one because we need to add or remove a character, which is one change.

Figure 11:
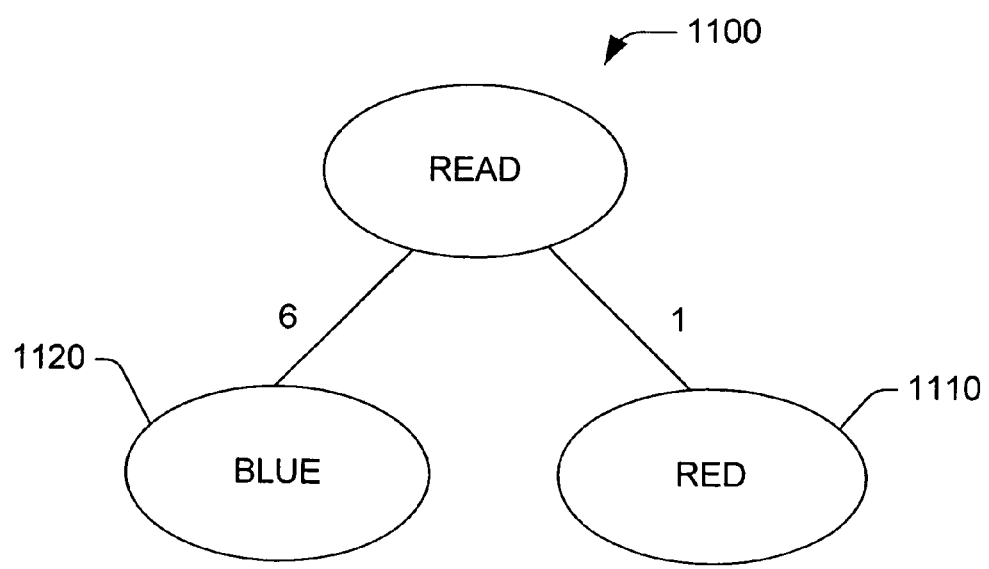
FIG. 11 illustrates alternative example results associated with applying an alternative edit-distance algorithm to the a portion of the Similarity Graph, which creates the Edit-Distance Graph in accordance with an embodiment of the invention.

However, when the edit distance is characterized by the number of operations, edit distances for some edges may increase. FIG. 11 illustrates alternative example results associated with applying an alternative edit-distance algorithm to the a portion of the Similarity Graph, which creates the Edit-Distance Graph in accordance with an embodiment of the invention. With regard to edge (1100, 1110), the edit distance remains the same because either a character is deleted via a delete operation, which removes the "A" or a character is inserted via an insert operation, which inserts the "A". The edit distance is one operation. With regard to edge (1100, 1120) the edit distance is six operations. The minimum operation requires include three delete operations, followed by three insert operations. Thus, a total of six operations to make the edit from in either direction "read" to "blue." Each method for measuring edit-distances is acceptable, and embodiments of the invention may utilize either the character change method or operation count method.

The transformations applied to the Similarity Graph to generate the misspell graph include applying the edit-distance algorithm to the Similarity Graph to generate an Edit-Distance Graph that includes nodes and edges. The nodes representing atoms, and the edges representing the edit-distances between atoms. In turn, the Edit-Distance Graph is watermarked by deleting all edges with edit distances above the threshold for the keyword and by deleting all unconnected nodes. The watermarking of the Edit-Distance creates the Collapsed-Edit-Distance Graph, where the edit distances are recalculated. In turn, the Collapsed-Edit-Distance Graph is watermarked by deleting all edges with edit distances above the threshold and by deleting all unconnected nodes. Finally, the Collapsed-Edit-Distance Graph is marked based on usage frequencies of the terms included in the Collapsed-Edit-Distance Graph.

Figure 12:
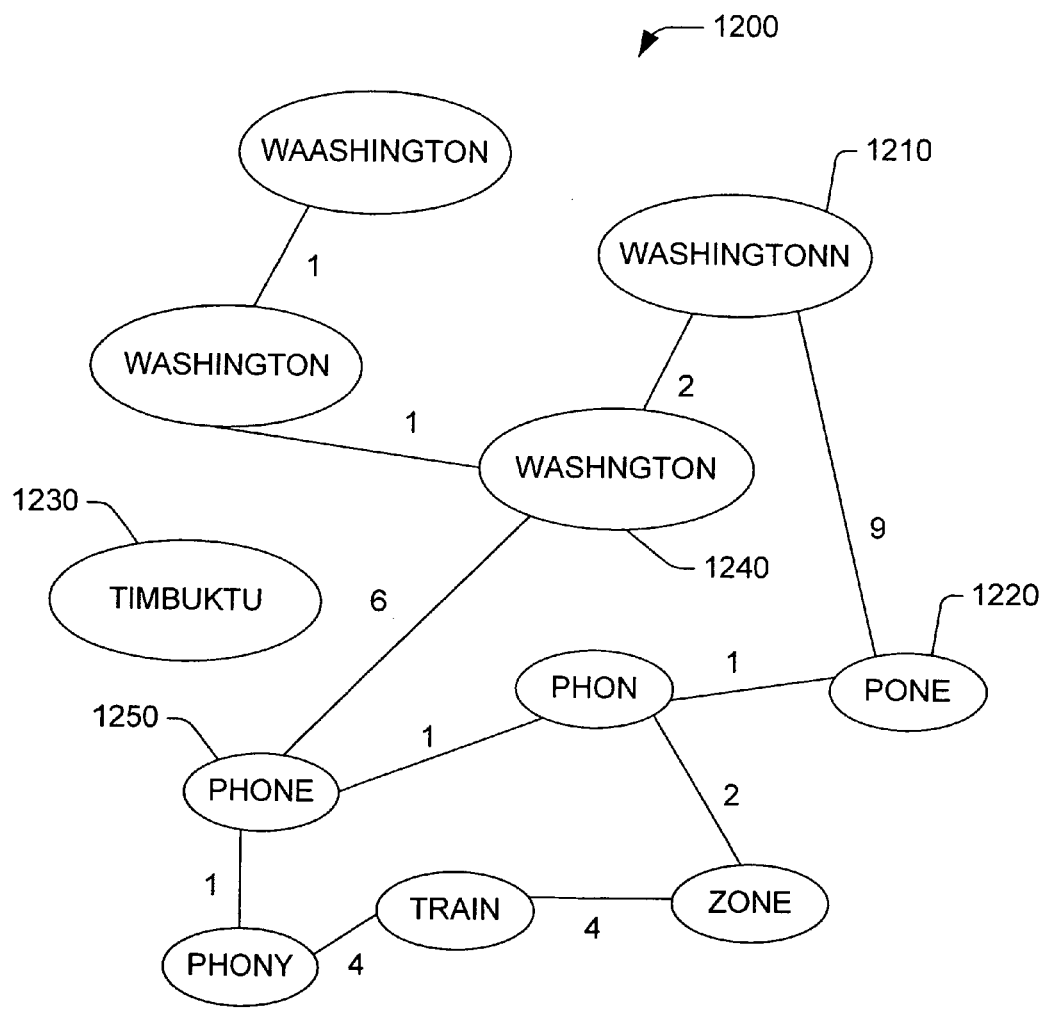
FIG. 12 illustrates applying the edit distance-algorithm discussed with respect to FIG. 10, to a simple Similarity Graph to create an Edit-Distance Graph in accordance with an embodiment of the invention.

FIG. 12 illustrates applying the edit distance-algorithm discussed with respect to FIG. 10, to a simple Similarity Graph 1200 to create an Edit-Distance Graph 1200 in accordance with an embodiment of the invention. The Edit distance Graph 1200 shows the edit distance between the atoms in the Edit-Distance Graph. Before, applying the watermarking step the thresholds are determined based on the length the keyword. For example, assuming, the keyword is ten characters, table 900 of FIG. 9 is referenced to determine the appropriate maximum-edit distance. For a ten-character term, the maximum-edit distance is four.

Figure 13A:
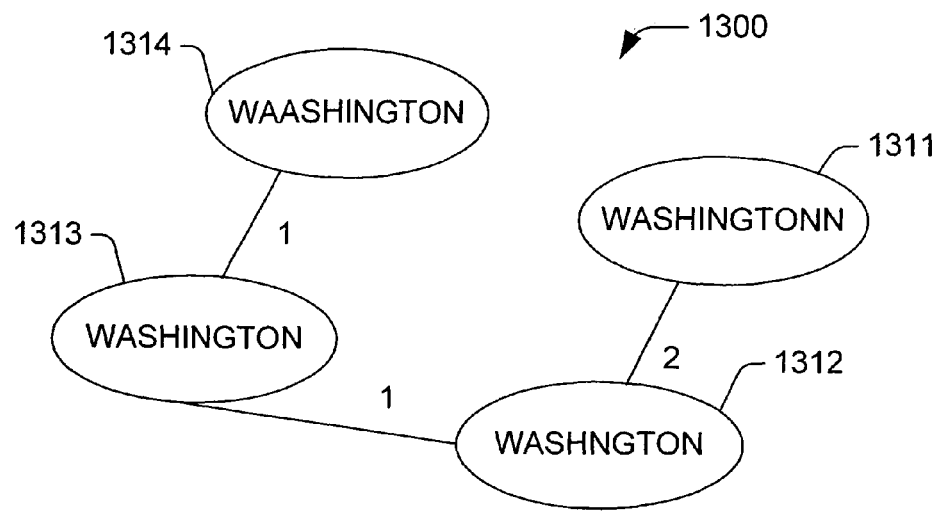
FIG. 13 illustrates how the Edit-Distance Graph created in FIG. 12 is transformed when watermarking to create a Collapsed-Edit-Distance Graph in accordance with an embodiment of the invention.
Figure 13B:
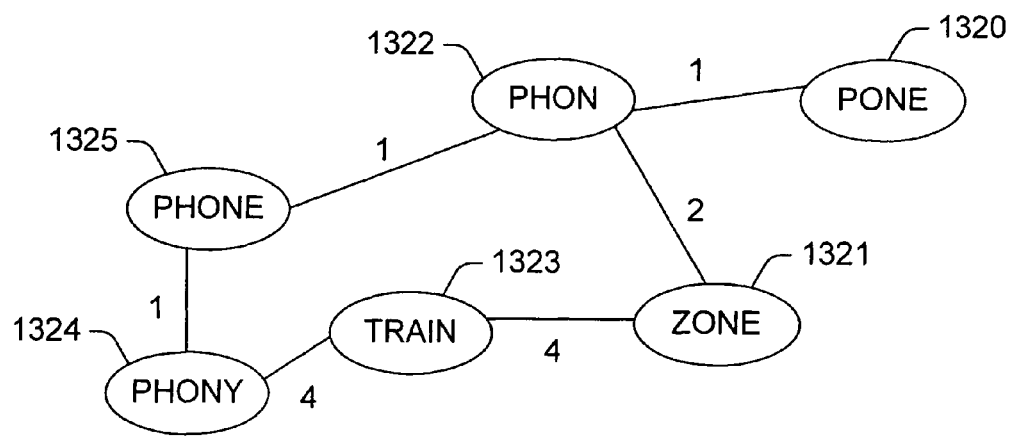

FIG. 13 illustrates how the Edit-Distance Graph created in FIG. 12 is transformed when watermarking to create a Collapsed-Edit-Distance Graph in accordance with an embodiment of the invention. The watermarking process deletes all edges greater that four. Thus edge (1210, 1220), and edge (1240, 1250) are removed. Additionally, the outliers, such as unconnected node 1230 do not add any value to the graph so it is discarded. In effect, Edit-Distance Graph is transformed to the Collapsed-Edit-Distance Graph. In the Collapsed-Edit-Distance Graph, there are two separate groups of mutually-connected nodes. In an embodiment, the mutually-connected nodes are nodes that are connected by one or more edges. New edit distances are calculated for the connected nodes in each group of mutually-connected nodes. In an embodiment, the threshold for the watermarking remains unchanged at four, thus watermarking the Collapsed-Edit-Distance Graph generates a watermarked Collapsed-Edit-Distance Graph that is no different from the Collapsed-Edit-Distance Graph.

However, in an alternate embodiment, an average number of characters for each group may be determined. Here, the average number of characters in the first group is around ten and the average number of characters in the second group is around five. Thus, during the second watermarking process, when the Collapsed-Edit-Distance Graph having each group is watermarked, the average number of characters for each group may be utilized to determine the appropriate threshold for each group. Here, the threshold for the group of mutually-connected nodes 1310-1313 is five and the threshold for the group of mutually-connected nodes 1320-1325 is one. Utilizing the updated thresholds, affects the group of mutually-connected nodes 1320-1325, because more than one edge is above the threshold. Edge (1322, 1321), edge (1321, 1323) and edge (1323, 1324) will be removed. Additionally, nodes 1323 and 1321 are removed because they are outliers; and are no longer connected to the group of mutually-connected nodes (1320, 1322, 1325 and 1325). The updated thresholds did not affect the group of mutually-connected nodes 1310-1313. Thus the watermarked Collapsed-Edit-Distance Graph is different from the Collapsed-Edit-Distance Graph.

Figure 14A:
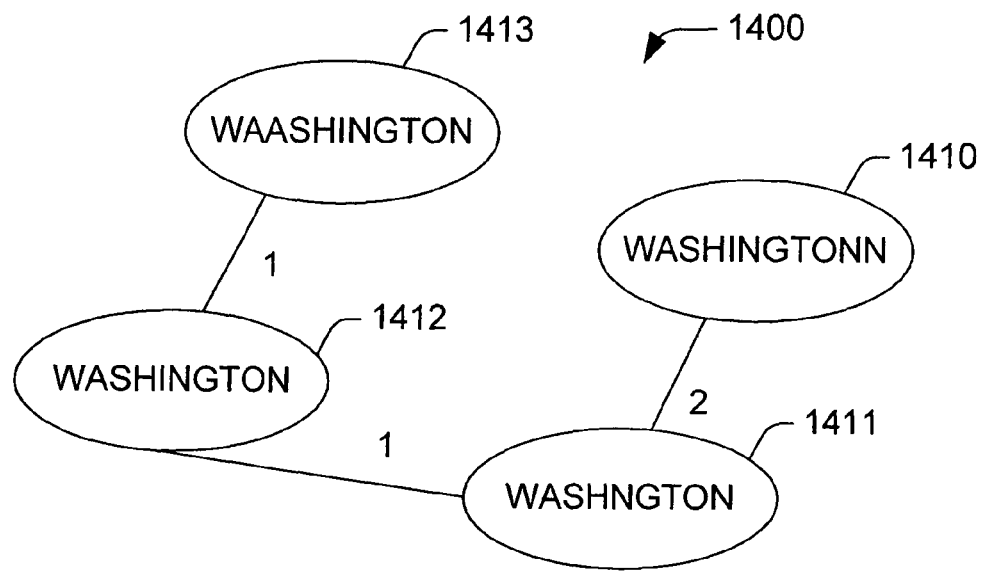
FIG. 14 illustrates the results of a second watermarking on the Collapsed-Edit-Distance Graph produced after the first watermarking phase discussed in FIG. 13 in accordance with an embodiment of the invention.
Figure 14B:
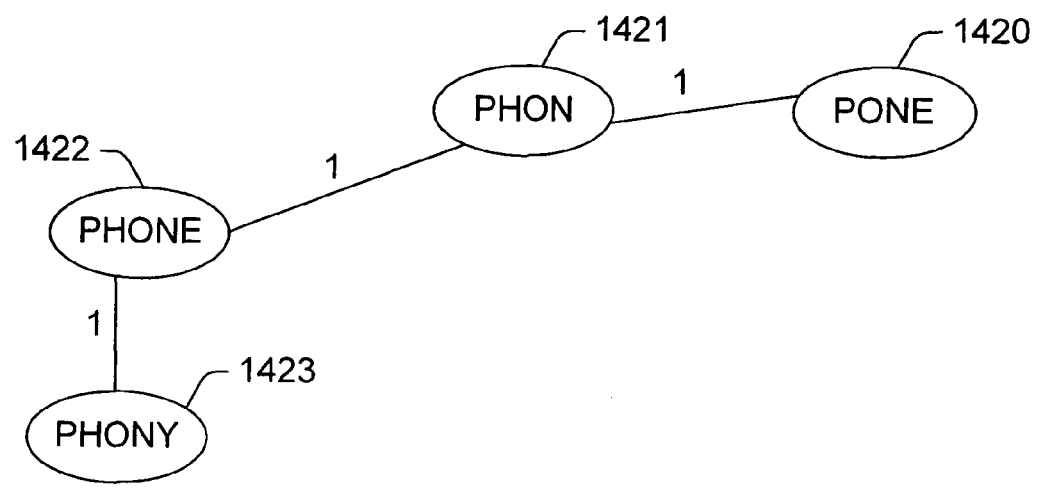

FIG. 14 illustrates the results of a second watermarking on the Collapsed-Edit-Distance Graph produced after the first watermarking phase discussed in FIG. 13 in accordance with an embodiment of the invention. The watermarked Collapsed-Edit-Distance Graph contains two groups of mutually-connected nodes. The first group is 1410-1413 and the second group is 1420-1423. The watermarked Collapsed-Edit-Distance Graph is marked by a coloring process. For each group of mutually-connected nodes, a root node is elected based on the usage frequencies associated with atoms corresponding to all nodes in each group of mutually-connected nodes. For each group, the atom having the highest usage frequency is elected to be the root node, and the root node is colored green and the remaining nodes in the mutually-connected group are colored red. Thus, the Similarity Graph has been transformed to a Marked-Collapsed-Edit-Distance Graph, which has one or more groups of mutually-connected nodes, each group having a root node. In an embodiment of the invention, for each group the root node represents the popular spelling for a term, and the non-root nodes represent the variations or mutations of the root node.

Figure 15A:
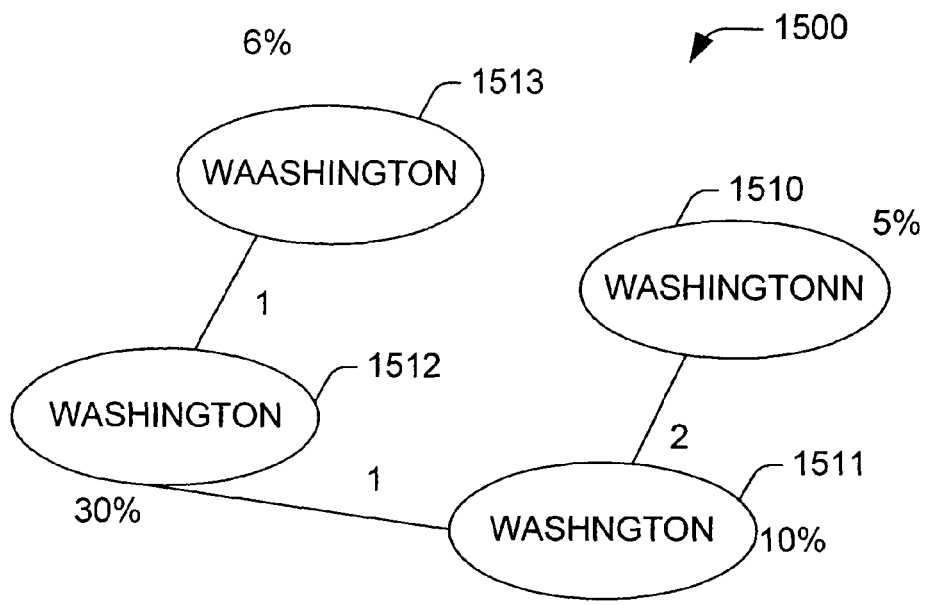
FIG. 15 illustrates results of a Marked-Collapsed-Edit-Distance Graph that was produced by coloring the watermarked Collapsed-Edit-Distance Graph after the second watermarking phase discussed in FIG. 14 in accordance with an embodiment of the invention.
Figure 15B:
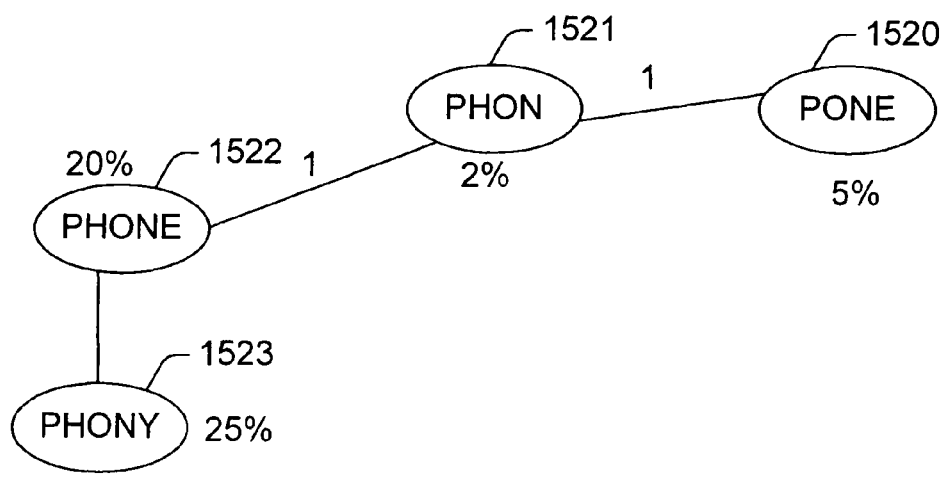

FIG. 15 illustrates results of a Marked-Collapsed-Edit-Distance Graph that was produced by coloring the watermarked Collapsed-Edit-Distance Graph after the second watermarking phase discussed in FIG. 14 in accordance with an embodiment of the invention. The first and second group of mutually-connected nodes may include nodes that are linked serially. In an embodiment of the invention, when traversing the Marked-Collapsed-Edit-Distance Graph it computationally inefficient to retrieve to all misspelling if the group of mutually-connected nodes are serially linked. Thus, for each group of nodes that has non-root nodes within the threshold edit distance that are not connected to the root node, and are connected to another non-root node, the non-root node edges are removed and a direct connection to the root node is created. Alternatively, the connection to the root node is created prior to removing the non-root-node edges. The non-root-node edges are edges that connect only non-root nodes.

Figure 16A:
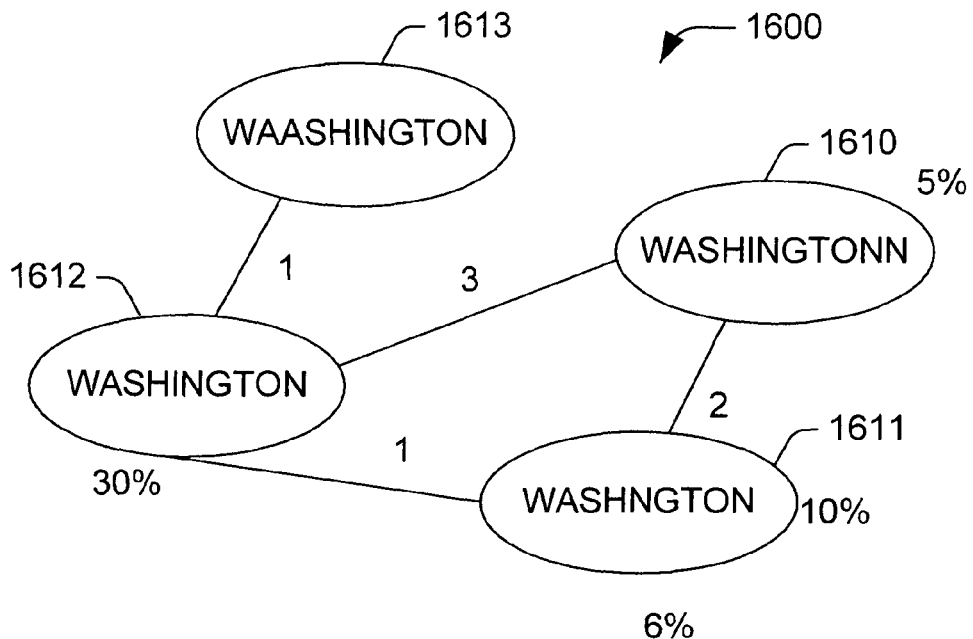
FIG. 16 illustrates optimizing the Marked-Collapsed-Edit-Distance Graph by reorganizing the nodes of the Marked-Collapsed-Edit-Distance Graph to create a star graph, which may be utilized to reduce look-up times in the Marked-Collapsed-Edit-Distance Graph in accordance with an embodiment of the invention.
Figure 16B:
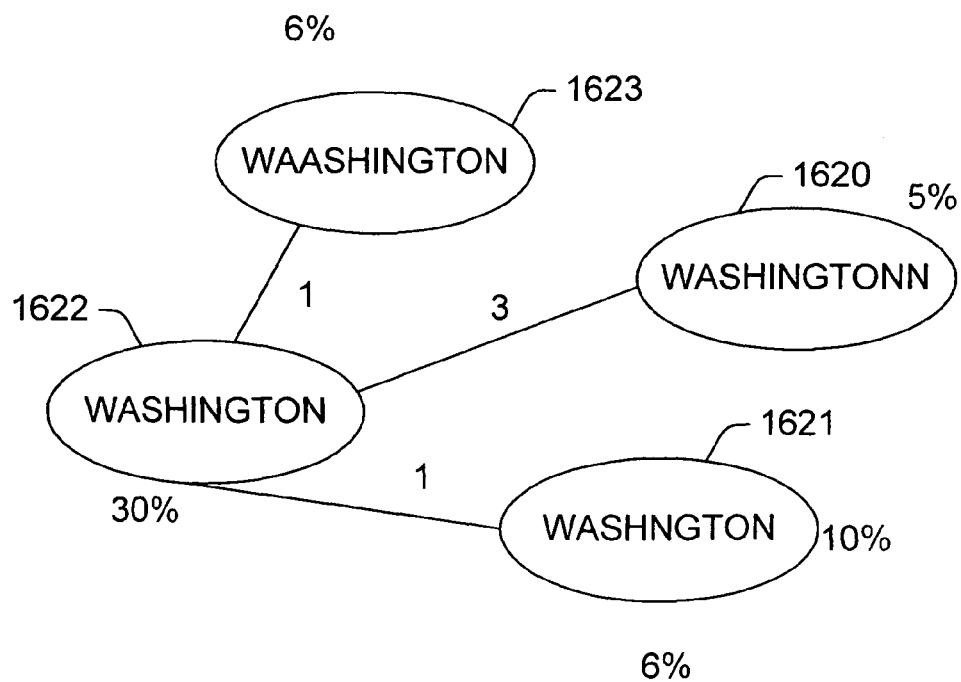

FIG. 16 illustrates optimizing the Marked-Collapsed-Edit-Distance Graph by reorganizing the nodes of the Marked-Collapsed-Edit-Distance Graph to create a star graph, which may be utilized to reduce look-up times in the Marked-Collapsed-Edit-Distance Graph in accordance with an embodiment of the invention. In FIG. 16, we transform one of the two groups of mutually-connected nodes. The group of mutually-connected nodes 1610-1613 represents variants of "Washington." The root node for the group of mutually-connected nodes 1610-1613 is determined by looking at the color associated with each node. Nodes 1612 is marked green, which indicates this is the root node. Each non-root node 1611 and 1613 is connected. Node 1610 is not a direct neighbor to the root node 1612. Thus, edge (1610, 1612) is created to directly link node 1610 and 1612 together. After creating edge (1610, 1612) all non-root edges from node 1610, such as edge (1610, 1611) are removed. The edge (1610, 1611) is removed and the Marked-Collapsed-Edit-Distance Graph is transformed to Star-Marked-Collapsed-Edit-Distance Graph. In an embodiment of the invention, this transformation may occur upon user request. In certain embodiment's, the user is notified that a star transformation is available for each group of mutually-connected nodes. Accordingly, the Star-Marked-Collapsed-Edit-Distance Graph provides all non-root nodes lacking a connection to root node and within the threshold a direct connection to the root node by removing the non-root-node edges and replacing those edges with root node edges.

After transforming the Similarity Graph to a misspell graph, such a Marked-Collapsed-Edit-Distance Graph or Star-Marked-Collapsed-Edit-Distance Graph, the misspell graph is loaded into a data structure for efficient processing when accessed by a component, device or user.

Figure 17:
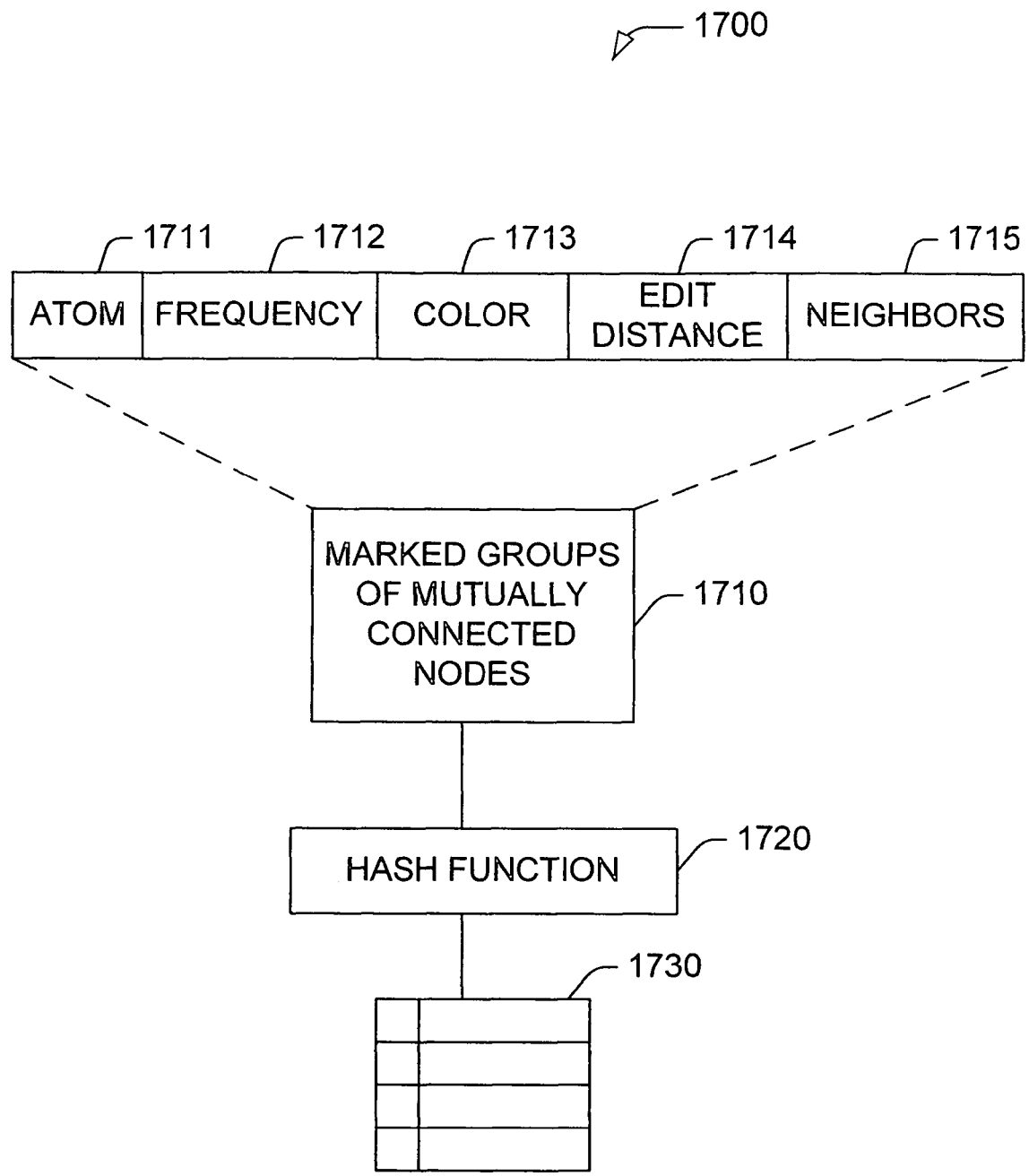
FIG. 17 illustrates a data structure that hashes and stores the Marked-Collapsed-Edit-Distance Graph in accordance with an embodiment of the invention.

FIG. 17 illustrates a data structure that hashes and stores the Marked-Collapsed-Edit-Distance Graph in accordance with an embodiment of the invention.

The marked groups of mutually-connected nodes 1710 include information about each node in the groups. Each node in the marked group specifies details including the atom 1711, frequency 1712, color 1713, edit distance 1714, and neighbors 1715. The marked group is hashed utilizing a hashing function 1720. In an embodiment, the hash function may are Message-Digest algorithm 5 (MD5) and Secure Hash Algorithm (SHA-1). After hashing the marked group to generate the key, the node details 1711-1715 is stored in look-up table 1730 based on the key.

One or more interfaces may utilize information stored in the data structure to provide related terms or misspells associated with a keyword. In an embodiment of the invention, the interfaces may be utilized with an advertisisng system or a serach engine. The interfaces provide a mechansim for a user to provide a keyword and to return results that include contextual variants of the keyword. Additionally, in an alternate embdoiment, the interface may also include the ability to provide misspells to the user based on the keyword entered.

Figure 20:
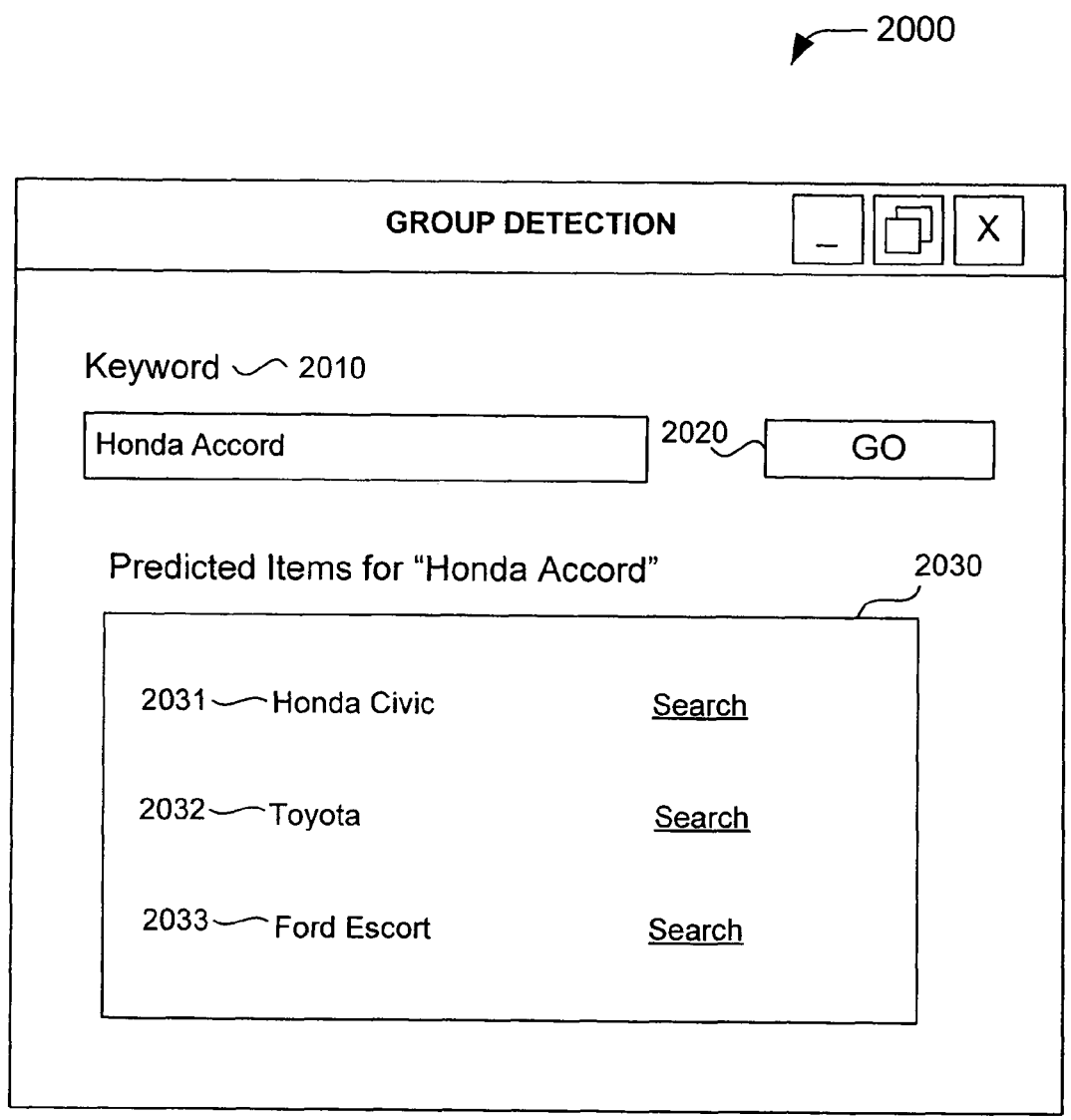
FIG. 20 illustrates a graphical user interface utilized to generate contextually related terms for a keyword in accordance with an embodiment of the invention.

FIG. 20 illustrates a graphical user interface 2000 utilized to generate contextually related terms for a keyword in accordance with an embodiment of the invention. The graphical user interface includes a text filed 2010 to allows a user to input one or more keywords. After the user intiates the request, results are provided in the result area 2030. In an embodiment, the resutlts include terms that are contextually related to the keyword that was entered in the text field 2010. For instance, when a user types in "honda accord," the results provided would included contextually similar terms. The similar terms, inlcude, but are not limited to, "camry," "honda civic," and "neon." Additionally, the user may be provided with an option to intiate a search on any selectable combination of the similar terms.

Figure 21:
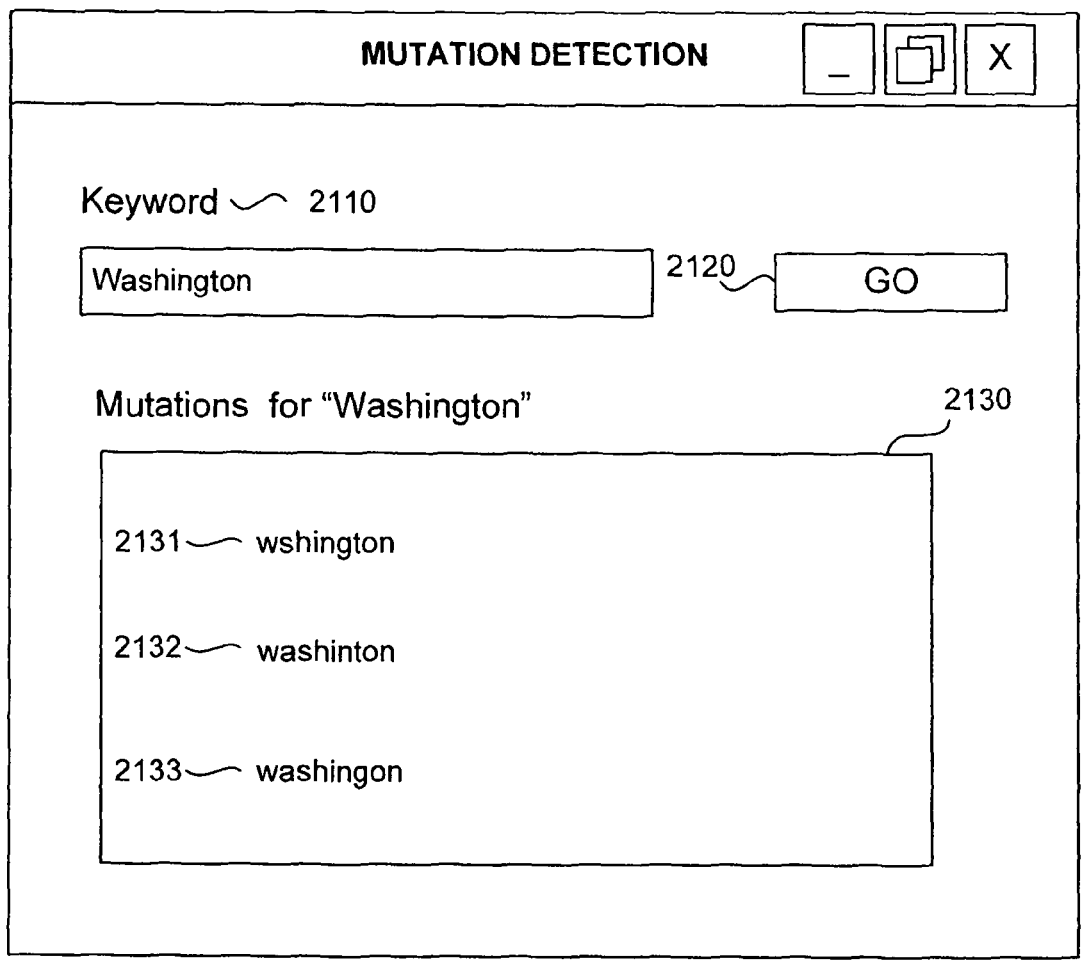
FIG. 21 illustrates a graphical user interface utilized to generate variants for a keyword.

FIG. 21 illustrates a graphical user interface 2100 utilized to generate variants for a keyword. The graphical user interface 2100 includes a text filed 2110 that allows a user to input one or more keywords. After the user intiates the request, results are provided in the result area 2130. In an embodiment, the resutlts include misspells of the keyword that was entered in the text field 2010. For instance, a user may enter a keyword "washington," in response the user receives mutations, including spelling variations on "washington." The mutations may include, but are not limited to "washngton," or "waashington," etc.

In an embodiment of the invention, the graphical user interfaces described in FIGS. 20 and 21 may be utilized by search engines or advertisement servers. The graphical user interface may be modified to allow advertisers that bid on terms, to receive one or more terms that are related to the advertiser's terms. Additionally the graphical user interface may be modified to display an offer that defines the prices at which the terms, related terms, and misspellings may be purchased during a specified time period. In alternate embodiments, query terms that include misspells are automatically corrected by the search engine to reduce latency periods associated with correcting the misspells.

Figure 18:
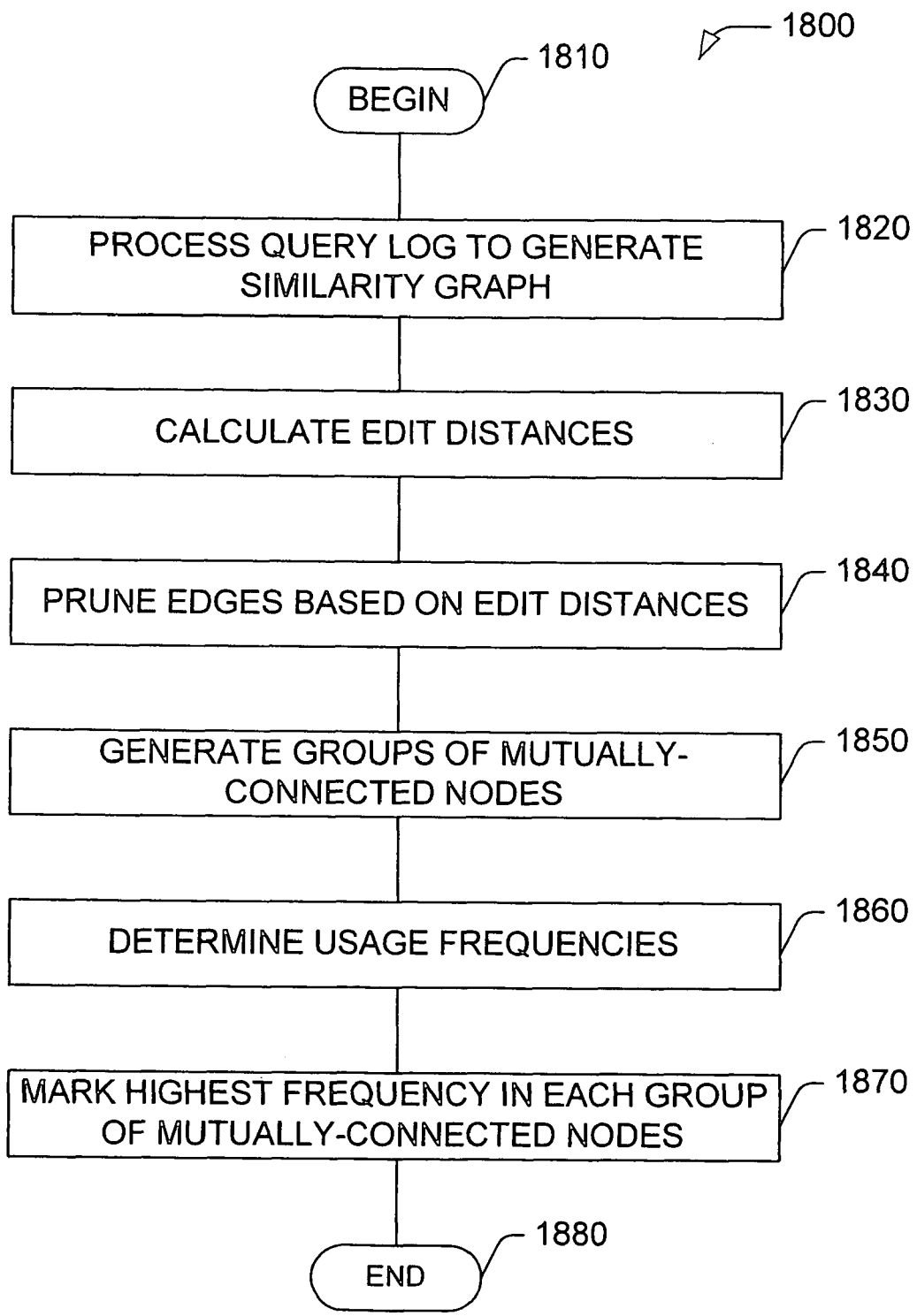
FIG. 18 is a flow diagram that illustrates a computer-implemented method for transforming the Similarity Graph to a Marked-Collapsed-Edit-Distance Graph in accordance with an embodiment of the invention.
Figure 19:
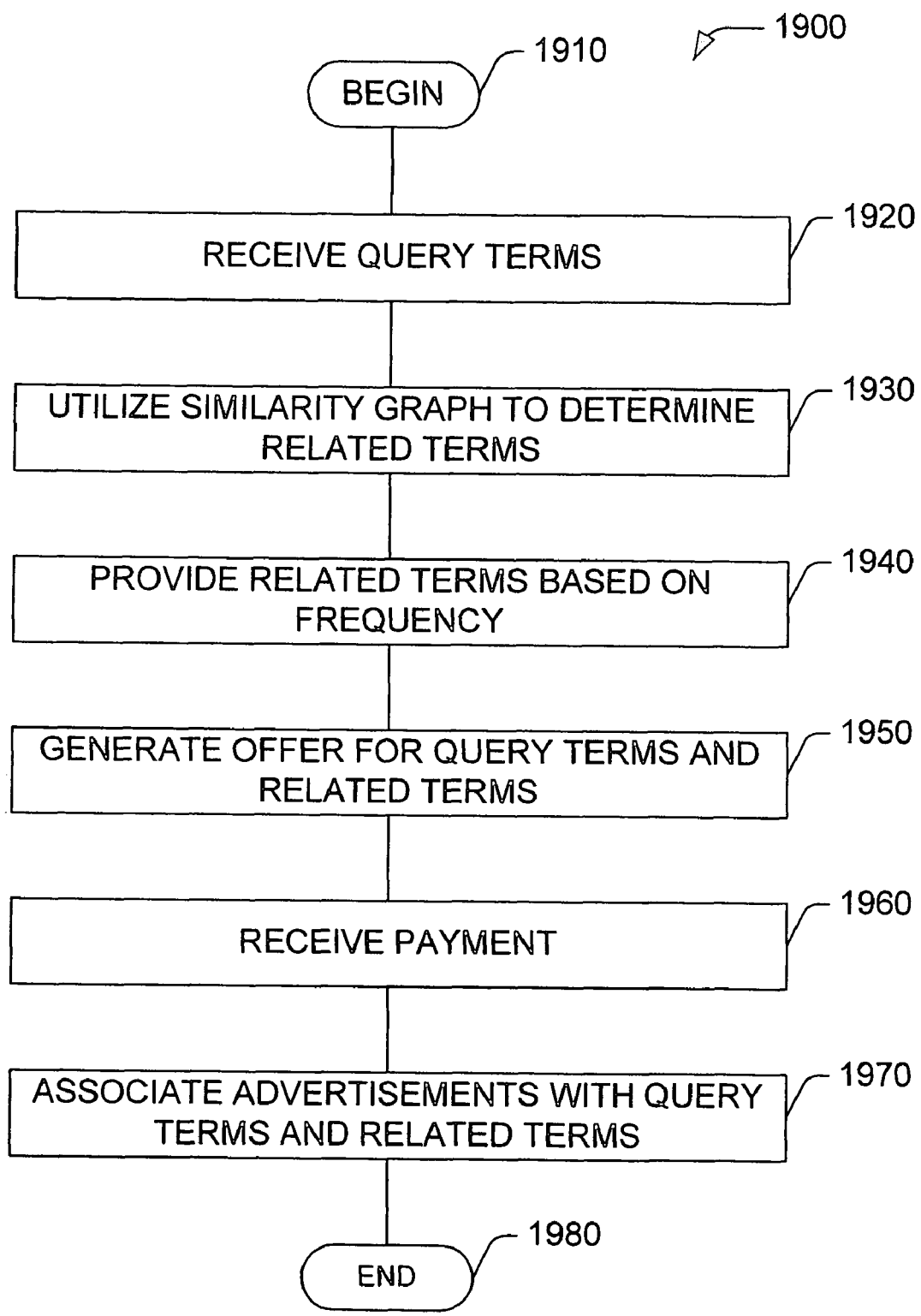
FIG. 19 is a flow diagram that illustrates a computer-implemented method for automatically receiving related terms to query terms in accordance with an embodiment of the invention.

In view of the exemplary systems shown and described above, methodologies that may be implemented in accordance with the embodiments will be better appreciated with reference to the flow charts of FIGS. 18-19. While, for purposes of simplicity of explanation, the methodologies are shown and described as a series of blocks, it is to be understood and appreciated that the embodiments are not limited by the order of the blocks, as some blocks may, in accordance with an embodiment, occur in different orders or concurrently with other blocks from that shown and described herein. Moreover, not all illustrated blocks may be required to implement the methodologies in accordance with the embodiments.

Certain embodiments of the invention may be described in the general context of computer-executable instructions, such as program modules, executed by one or more components that are tangibly embodied on a computer-useable medium. Generally, program modules include routines, programs, objects, data structures, etc., that perform particular tasks or implement particular abstract data types. Typically, the functionality of the program modules may be combined or distributed as desired in various instances of the embodiments.

FIG. 18 is a flow diagram that illustrates a computer-implemented method for transforming the Similarity Graph to a Marked-Collapsed-Edit-Distance Graph in accordance with an embodiment of the invention. The method begins in step 1810 after queries are accumulated in the query logs. After a week of accumulating queries, the query logs are processed to generate a Similarity Graph in step 1820. In certain embodiments, the accumulation period may vary from one week to one-year. In turn, the Similarity Graph is proceeds to calculate edit distance between nodes in the Similarity Graph. The edit distances are assigned to edges of the Similarity Graph to generate an Edit-Distance Graph in step 1830. Like the Similarity Graph, the Edit-Distance Graph includes nodes and edges, but unlike the Similarity Graph, the edges in the Edit-Distance Graph are weighted by edit distances. In step 1840, the edges of the Edit Distance Graph are pruned to remove all edges with edit-distances above a specified threshold. In turn, the Edit-Distance Graph creates one or more groups of mutually-connected nodes, where the group of mutually-connected nodes does not include outliers, in step 1850. For each node in the group of mutually connected nodes a usage frequency is calculated based on the number of times a particular atom or term in the group of mutually-connected nodes was used in the query log during the accumulation period, in step 1860. For each group of mutually-connected nodes, the node with the highest usage frequency is marked in step 1870. The method ends is step 1880.

FIG. 19 is a flow diagram that illustrates a computer-implemented method for automatically receiving related terms to query terms in accordance with an embodiment of the invention. The method begins in step 1910 when a user transmits query terms. In step 1920, the query terms are received at the search engine or advertisement server. A Similarity Graph is processed to provide related terms or misspells for the query terms in step 1930. Related terms are provided in response to the query terms, the related terms having terms that are popular based on a usage frequency in step 1940. In step 1950, an offer is generated for the query terms and related terms, the offer including a price and time restriction. In step 1960 the payment is received to secure the query terms and related terms for the time period disclosed in the offer. Advertisements are associated with the purchased query terms and the related terms in step 1970. Thus, searches for the purchased query terms or related terms should provide results having the associated advertisements. The method ends in step 1980.

In summary, embodiments of the invention process query logs to determine context usage and frequency. The query logs are further processed to generate a Similarity Graph, which in turn is transformed to provide related terms or misspells. The transformations include removing edges and nodes based on edit distance between the nodes of the Similarity Graph. The transformed Similarity Graph may be hashed and loaded into memory to enable an advertisement server or search engine to process requests.

An alternate embodiment of the invention may include a compressed data structure stored on computer-readable medium, the compressed data structure having a collection of mutually-connected nodes. Each node includes an atom field related to the one or more query terms, a frequency field representing the usage frequency for the atom, a color field that indicates whether the atom is a root node or non-root node, an edit distance field to track edit distances between the atom and its neighbors, and a neighbor field that stores references to one or more neighbors. The compressed data structure may be a look-up table that stores a hash key for each node, wherein the hash key references, the color, edit distance, and neighbors. Accordingly, accessing the data structure enables a search engine or advertisement server to provide related terms or misspelled terms for a keyword.

The foregoing descriptions of the invention are illustrative, and modifications in configuration and implementation will occur to persons skilled in the art. For instance, while the present invention has generally been described with relation to FIGS. 1-21, those descriptions are exemplary. Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims. The scope of the invention is accordingly intended to be limited only by the following claims.

We claim:

1. A computer-implemented method to provide related terms in an advertising system, the method comprising:
   receiving query terms;
   accessing a graph to determine related terms for the query terms, wherein the graph includes a collection of nodes and edges, the nodes correspond to atoms included in a query log, and the edges represent a relationship between the nodes that indicate whether the nodes connected to the edge are similar;
   calculating edit distances between nodes in the graph, wherein the edit distance represents a number of operations performed to transform each node in the graph to a related node;
   assigning the edit distances to edges;
   pruning edges assigned edit distances above a maximum-edit threshold, wherein pruning edges assigned edit distances above a maximum-edit threshold further comprises:
      determining an average number of characters for each group of mutually connected nodes,
      assigning the average number of characters as the maximum-edit threshold for that group of mutually connected nodes, and
      removing edges in each group of mutually connected nodes that are above the maximum-edit threshold for that group of mutually connected nodes;
   removing disconnected nodes to generate groups of mutually-connected nodes;
   electing a root node for each group of mutually-connected nodes, wherein electing a root node for each group of mutually-connected nodes further comprises,
      determining usage frequencies for atoms corresponding to the nodes in each group of mutually-connected nodes,
      assigning the usage frequencies to the nodes in each group of mutually-connected nodes, and
      marking the node with the largest usage frequency in each group of mutually-connected nodes;
   and
   providing the related terms corresponding to the nodes having usage frequencies above a predetermined frequency threshold.

2. The computer-implemented method according to claim 1, further comprising:
   generating an offer for the query terms and related terms, the offer specifying a price and time period;
   receiving a payment equal to the price; and
   associating advertisements with the query term and related terms for the time period.

3. The computer-implemented method according to claim 1, further comprising:
   selecting one or more groups of mutually-connected nodes associated with the query terms and providing the atoms corresponding to the one or more groups of mutually connected nodes as the related terms.

4. A computer-implemented method to generate a listing of misspells, the method comprising:
   receiving a graph having a collection of nodes and edges, wherein the nodes represent query terms in a query log;
   calculating edit distances between nodes in the graph, wherein the edit distance represents a number of character changes performed to transform each node in the graph to a related node;
   assigning the edit distances to edges connecting the nodes;
   pruning edges that have edit distances above a specified threshold to create groups of mutually-connected nodes, wherein pruning edges that have edit distances above a specific threshold further comprises:
      determining an average number of characters for each group of mutually connected nodes,
      assigning the average number of characters as the specified threshold for that group of mutually connected nodes,
      removing edges in each group of mutually connected nodes that are above the specified threshold for that group of mutually connected nodes, and
      removing disconnected nodes to generate groups of mutually-connected nodes;
   marking nodes in each group of mutually-connected nodes based on usage frequencies associated with the corresponding query terms, wherein marking nodes in each group of mutually-connected nodes based on usage frequencies associated with the corresponding query terms further comprises,
      electing a root node in each group of mutually connected nodes,
      generating direct edges between the elected root nodes and other nodes in the group of mutually-connected nodes, for each other node that is within the specified threshold to the elected root nodes, and
      removing edges that connect the other nodes to each other;
   loading the marked groups of mutually-connected nodes into a look-up table, wherein the marked groups of mutually-connected nodes include misspells; and
   utilizing the marked groups of mutually-connected nodes to respond to user queries having misspells.

5. The computer-implemented method according to claim 4, wherein marking nodes in each group of mutually-connected nodes based on usage frequencies associated with the corresponding query terms further comprises,
   assigning colors to the nodes based on the usage frequencies in the query log.

6. The computer-implemented method according to claim 4, wherein utilizing the marked groups of mutually-connected nodes to respond to user queries having misspells further comprises, performing a search in the look-up table to correct user queries.

7. A system having processors and memories to generate a listing of misspells, the system comprising:

a search engine to respond to queries, the search engine having a query log;

an advertisement component to respond to bids on keywords;

a graph generation component that processes the query log to generate a graph having nodes and edges, wherein the nodes represent query terms; and a mutator component that utilizes the graph to generate a misspell graph having nodes that represent correct spellings connected to nodes that represent misspells, wherein the misspell graph is generated when the mutator component performs the following:

calculating edit distances between nodes in the graph, wherein the edit distance represents a number of character changes performed to transform each node in the graph to a related node;

assigning the edit distances to edges connecting the nodes;

pruning edges that have edit distances above a specified threshold to create groups of mutually-connected nodes, wherein pruning edges that have edit distances above a specified threshold further comprises:

determining an average number of characters for each group of mutually connected nodes, assigning the average number of characters as the specified threshold for that group of mutually connected nodes, removing edges in each group of mutually connected nodes that are above the specified threshold for that group of mutually connected nodes, and removing disconnected nodes to generate groups of mutually-connected nodes;

marking nodes in each group of mutually-connected nodes based on usage frequencies associated with the corresponding query terms, wherein marking nodes in each group of mutually-connected nodes based on usage frequencies associated with the corresponding query terms further comprises, electing a root node in each group of mutually connected nodes, generating direct edges between the elected root nodes and other nodes in the group of mutually-connected nodes, for each other node that is within the specified threshold to the elected root nodes, and removing edges that connect the other nodes to each other;

returning the marked groups of mutually-connected noses as the misspell graph; and the advertisement component accesses the misspell graph to generate a list of misspells associated with the keywords and provides the list of misspells associated with the keywords as recommendations in order of usage frequency in the query log.

8. The system according to claim 7, wherein the misspell graph provides misspells based on the edit distance.

9. The system according to claim 7, wherein the misspell graph is loaded into the advertisement component.

10. The system according to claim 9, wherein the advertisement component receives a bid on a keyword.

11. The system according to claim 10, wherein the advertisement component applies a watermark to the misspell graph by deleting all edges with an edit distance above a threshold for the keyword, deleting any unconnected nodes, and assigning a color to the connected nodes of the misspell graph based on usage frequency.

12. The system according to claim 7, wherein the misspell graph is loaded into the search engine.

13. The system according to claim 12, wherein the search engine receives a user query having a misspell.

14. The system according to claim 13, wherein the search engine accesses the misspell graph to correct the user query.

* * * * *